(12) United States Patent
Nozawa

(10) Patent No.: US 6,606,455 B2
(45) Date of Patent: Aug. 12, 2003

(54) LENS-FITTED FILM UNIT

(75) Inventor: Yasushi Nozawa, Minami-Ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/939,802

(22) Filed: Aug. 28, 2001

(65) Prior Publication Data

US 2002/0057906 A1 May 16, 2002

(30) Foreign Application Priority Data

Aug. 30, 2000 (JP) ........................... 2000-261480

(51) Int. Cl.⁷ ............................................... G03B 17/02
(52) U.S. Cl. ............................................................ 396/6
(58) Field of Search ........................... 346/6, 484, 485, 346/446

(56) References Cited

U.S. PATENT DOCUMENTS 5,233,871 A * 8/1993 Schwarz et al. ............... 396/6
5,422,231 A    6/1995 Nozawa .......................... 430/508
6,222,995 B1   4/2001 Uchida ............................ 396/6
6,233,403 B1 * 5/2001 Aratame et al. ............... 396/6

FOREIGN PATENT DOCUMENTS

JP    2000-131727    * 5/2000    ........... G03B/7/097

* cited by examiner

Primary Examiner—Russell Adams
Assistant Examiner—Rochelle Blackman
(74) Attorney, Agent, or Firm—Birch, Stewart, Kolasch & BIrch, LLP

(57) ABSTRACT

A lens-fitted film unit comprises photographic mechanism provided with a taking lens, a shutter device and an aperture. The lens-fitted film unit has been loaded with an unexposed photographic film. The shutter device and the photographic film satisfying the conditional formula:

$$\log_2(1/T) - \log_2(0.3 \times S) < -1.7$$

wherein T represents a shutter speed and S represents an ISO speed.

21 Claims, 4 Drawing Sheets

LENS-FITTED FILM UNIT

CROSS-REFERENCE TO RELATED APPLICATIONS

This application is based upon and claims the benefit of priority from the prior Japanese Patent Application No. 2000-261480, filed Aug. 30, 2000, the entire contents of which are incorporated herein by reference.

BACKGROUND OF THE INVENTION

1. Field of the Invention

The present invention relates to a lens-fitted film unit which can provide sharp photographs in various photographing environments.

2. Description of the Related Art

Lens-fitted film units each comprising a unit body fitted with built-in simple photographing means such as a taking lens, a shutter and a film winding up, wherein an unexposed photographic film has been charged at the time of manufacturing thereof, are being marketed. The lens-fitted film units, because of, for example, the readiness thereof, are contributing to the familiarization of photographs. Some types of lens-fitted film units are fitted with built-in strobes which enable photographing during the night, indoors, etc., and are being used by a large number of users.

These lens-fitted film units are provided with various measures for improving the performance thereof. In particular, attention has been drawn to the problem of unsuccessful photographs caused by under-exposure at indoor photographing because of such restrictions that it is needed to cope with a variety of conditions such as photographing in bright outdoor scenes and indoor strobe photographing, despite the absence of any exposure controlling function or only with a simple exposure controlling function, and that only a strobe of small guide number can be provided because of, for example, cost and compactness. Jpn. Pat. Appln. KOKAI Publication No. (hereinafter referred to as JP-A-5-188454 discloses under-exposure preventive measures comprising employing an EV value of 11 to 13.5 with respect to a film unit and employing a guide number of 10 to 15 with respect to a strobe. JP-A-6-258787 discloses a method of providing satisfactory photographs through every photographing including indoor photographing and outdoor photographing with the use of a lens-fitted film unit fitted with a built-in lightsensitive material having a scope of specific photographic speeder in a region of 640 or more and point gamma of 0.4 or more. Further, JP-A-8-184944 discloses under-exposure preventive measures for strobe photographing by the use of a lens-fitted film unit fitted with shutter speed switching means interlocked with strobe switching means. Also, JP-A's-9-5817 and 10-260507 disclose under-exposure preventive measures by switching an aperture in accordance with the luminance of a subject.

Furthermore, JP-A-2000-131727 describing a prior invention of the present applicant discloses a method of optimizing a density, especially a density ratio between background and main subject exposed to strobe flashing, by the use of a lens-fitted film unit which satisfies the conditional formula:

$$-6 \leq 2 \log_2(A) + \log_2(1/T) - \log_2(0.3 \times S) \leq 5$$

wherein T represents the shutter speed of shutter (sec), A represents the stop value of aperture and S represents the ISO speed of photographic film.

These inventions exert respective effects, and have exerted marked effects especially in the improvement of under-exposure dull photographs.

BRIEF SUMMARY OF THE INVENTION

It is an object of the present invention to provide a lens-fitted film unit which enables providing photographs being excellent in sharpness, i.e., another important performance of photographs.

More particularly, the object of the present invention is to provide a lens-fitted film unit which reconciles providing photographs being excellent in sharpness and implementing under-exposure preventive measures for photographs as aforementioned.

The above objects could be attained by the following means.

(1) A lens-fitted film unit comprising photographic mechanisms including a taking lens, a shutter device and an aperture, and having been loaded with an unexposed photographic film, wherein the shutter device and the photographic film satisfying the conditional formula:

$$\log_2(1/T) - \log_2(0.3 \times S) < -1.7$$

wherein T represents a shutter speed of the shutter device and S represents an ISO speed of the photographic film.

(2) The lens-fitted film unit as defined in item (1) above, wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support, wherein at least one of the blue-sensitive, green-sensitive and red-sensitive silver halide emulsion layers with the maximum photographic speeds contains a silver halide emulsion in which 60% or more of the total projected area of grains contained in the silver halide emulsion is occupied by tabular grains having an aspect ratio of 5.0 or more; and wherein, with respect to the silver halide emulsion contained in the at least one silver halide emulsion layer having the maximum photographic speed and containing the tabular grains, the grain number defined by the following formula (I) is 1.00 or less, $$\text{grain number} = A_H/(D_c^2 \times T_h) \tag{I}$$

wherein $A_H$: a silver coating amount in terms of silver of the silver halide contained in the layer with the maximum photographic speed (g/m$^2$), $D_c$: an average equivalent circle diameter of the tabular grains contained in the layer with the maximum photographic speed ($\mu$m), and $T_h$: an average thickness of the tabular grains contained in the layer with the maximum photographic speed ($\mu$m), provided that, when each of the at least one layer with the maximum photographic speed contains a plurality of silver halide emulsions which was prepared by separate production processes and which contains silver halide grains of different average equivalent sphere diameters, it is only required that the above limitations with respect to the aspect ratio and grain number be satisfied with respect to the emulsion having the maximum average equivalent sphere diameter.

(3) The lens-fitted film unit as defined in item (1) above, wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support, wherein the blue-sensitive, green-sensitive and red-sensitive silver halide emulsion layers with the maximum photographic speeds each have a silver content of 0.3 to 1.3 g/m$^2$; and wherein at least two of the blue-sensitive, green-sensitive and red-sensitive silver halide emulsion layers with the maximum photographic speeds each contain silver halide grains in which 60% or more of the total projected area of the silver halide grains is occupied by tabular grains having an aspect ratio of 5.0 or more.

(4) The lens-fitted film unit as defined in item (1) above, wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support, wherein the blue-sensitive, green-sensitive and red-sensitive silver halide emulsion layers with the maximum photographic speeds have the total silver content of 1.5 to 3.5 g/m$^2$; and wherein at least two of the blue-sensitive, green-sensitive and red-sensitive silver halide emulsion layers with the maximum photographic speeds each contain silver halide grains in which 60% or more of the total projected area of the silver halide grains is occupied by tabular grains having an aspect ratio of 5.0 or more.

(5) The lens-fitted film unit as defined in any of items (2) to (4) above, wherein the tabular silver halide grains are those:

(a) whose average silver iodide content is in the range of 2 to 10 mol %, (b) whose surface silver iodide content is in the range of 1 to 4 mol %, and (c) having 10 or more dislocation lines per grain.

(6) The lens-fitted film unit as defined in any of items (1) to (5) above, which further comprises photometric means capable of outputting a light quantity signal corresponding to a subject light quantity, and a controlling mechanism capable of changing an exposure quantity to the photographic film in accordance with the light quantity signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an entire perspective view of a lens-fitted film unit in which the aperture controlling mechanism of FIG. 1 is built-in;

DETAILED DESCRIPTION OF THE INVENTION

Figure 1A:
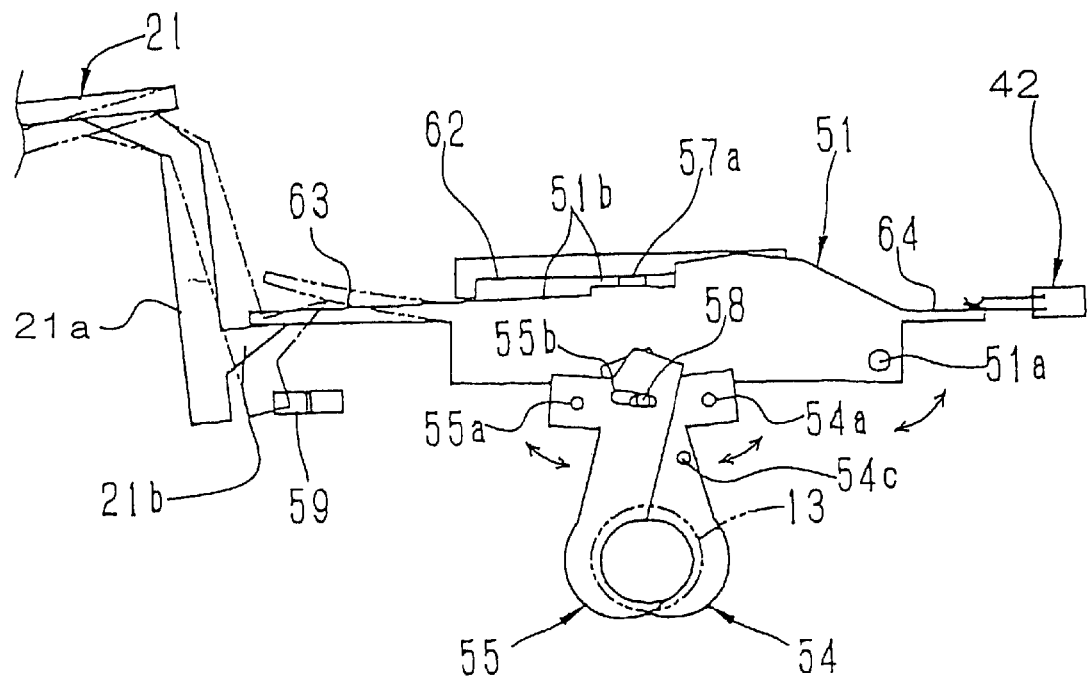
FIG. 1A and FIG. 1B are explanatory views showing an aperture controlling mechanism in operating conditions.

The present invention will be described in detail below.

First, the formula of the present invention: $\log_2(1/T) - \log_2(0.3 \times S)$ will be described (in the formula, T represents a shutter speed of the shutter device (sec), and S represents an ISO speed of the photographic film).

The members of the formula are known as TV (time value) and SV (speed value). T is the shutter speed expressed by, for example, 1/60, 1/125 or 1/250 sec, and S is the ISO speed expressed by a number such as 100, 400 or 1600. TV (time value) and SV (speed value) refer to expressions thereof by values according to the APEX system (additive system of photographic exposure system).

With respect to the lens-fitted film unit of the present invention, the value of the formula: $\log_2(1/T) - \log_2(0.3 \times S)$ must be less than −1.7. The value is preferably in the range of −4 to less than −1.8, and more preferably in the range of −3.5 to less than −1.9.

The larger the value of the formula: $\log_2(1/T) - \log_2(0.3 \times S)$, the more likely that a large stop value is required for maintaining the same speed as a system. Therefore, it is contemplated that, the smaller the value, the more likely that a distant scene, such as a landscape under clear sky, can be photographed sharply by the employment of a smaller aperture. It is further contemplated that, the smaller the value, the more likely that, even when a high speed is required as in indoor photographing, it is not needed to employ too large a stop value, so that a certain level of field depth can be secured, thereby enabling even a lens-fitted film unit not provided with any focus controlling function to secure a certain degree of sharpness.

For avoiding a camera movement and a subject movement, the shutter speed T is preferably in the range of 1/30 to 1/500 sec, more preferably 1/60 to 1/500 sec, and most preferably 1/100 to 1/250 sec.

The ISO speed S is preferably 640 or more, more preferably 1000 or more, and most preferably 1600 or more.

The aperture of the lens-fitted film unit of the present invention may be a variable one or a fixed one. In the use of a fixed aperture, the stop value is preferably in the range of 5.6 to 18, more preferably 8 to 16, and most preferably 9.5 to 13.

The lens-fitted film unit of the present invention is preferably provided with photometric means for outputting a light quantity signal corresponding to a subject light quantity; and a controlling means for changing an exposure quantity to the film in accordance with the light quantity signal.

For example, CdS (cadmium sulfide) can be used as the photometric means for measuring a subject light quantity.

Further, use can be made of a solar cell, CCD, MOS transistor, a photodiode, selenium or the like. Generally, elements capable of outputting a photometric result as an electrical signal can be utilized easily.

The changing of the exposure quantity to the photographic film can be accomplished by, for example, the method in which a stop down value is changed or the method in which the quantity of light transmitted through a lens is controlled by ND filters or the like. Most readily, the changing of the exposure quantity can be accomplished by providing two-stage controlling means, the one permitting a large exposure and the other permitting a small exposure. When the changing of stop down value is effected, the exposure quantity can be changed by application of two aperture plates with different opening diameters. When the quantity of transmitted light is controlled, the changing of exposure quantity can be realized by application of a ND filter. Occasionally, further multi-stage exposure controlling or non-staged continuously stepped exposure controlling can be effected.

When the two-stage exposure controlling is effected, a subject luminance at which switching is performed, is determined in advance. That is, the exposure is reduced when the subject luminance is higher than the predetermined one, and is increased when the subject luminance is lower than the predetermined one. The signal outputted by the photometric means is compared with the predetermined luminance in this manner, and interlocking with a mechanism capable of switching the quantity of exposure in accordance with the result of being larger or smaller, is effected. The switching of aperture can be realized by, for example, the method in which the aperture plate is physically moved or the method in which the substantial stop down value is changed by a concentration change of liquid crystal. In the method of physically moving the aperture plate, use can be made of a shape memory element capable of having configurational change depending on the passage of current as disclosed in JP-A-10-260507, the disclosure of which is incorporated herein by reference.

Also, use can be made of the method in which the aperture plate is moved by a motor. Further, the aperture plate can be moved by the use of an electromagnet as disclosed in JP-A-9-5817, the disclosure of which is incorporated herein by reference. The power required for moving the aperture plate can be obtained from a dry cell or secondary battery for strobe. Alternatively, the power can be obtained from a solar cell by making such a design that the moving of aperture plate is needed only in the instance of being greater than the predetermined luminance.

In the present invention, $F_1$ representing the brightest stop down value controllable which is set when the subject luminance detected by the above photometric means is lower preferably satisfies the relationship:

$$4.0 \leq F_1 \leq 11.0,$$

more preferably satisfies the relationship:

$$5.6 \leq F_1 \leq 9.5,$$

and most preferably satisfies the relationship:

$$6.7 \leq F_1 \leq 8.5$$

This stop down values are determined by the brightness for enabling reproducing background at the photographing indoors or in the nighttime and the depth of field required for a lens-fitted film unit of a fixed focus and a fixed shutter speed.

Further, in the present invention, $F_2$ representing the darkest stop down value controllable which is set when the subject luminance detected by the above photometric means is higher preferably satisfies the relationship:

$$11.0 \leq F_2 \leq 32,$$

and more preferably satisfies the relationship:

$$13.0 < F_2 < 22.$$

Satisfying these requirements enables falling of the exposure quantity to photographic film within an appropriate range of exposure even if a high-luminance subject is photographed outdoors in the daytime to thereby provide high-quality photographic prints.

The ISO speed of the photographic film to be charged in the lens-fitted film unit of the present invention, as aforementioned, is preferably 640 or more, more preferably 1000 or more, and most preferably 1600 or more.

It is known that increasing the speed of photographic film would cause the problem of deterioration of image quality, especially graininess, and further the problem of graininess deterioration and speed decrease invited with the passage of time under the influence of natural radiation or the like as disclosed in JP-A-63-226650. It is also known to use tabular emulsions disclosed in, for example, JP-A-63-226650 and U.S. Pat. No. 4,434,226 in order to improve these characteristics even if slightly.

The photographic film to be charged in the lens-fitted film unit of the present invention preferably includes two or more, more preferably three or more, silver halide emulsion layers with the same color sensitivity but different photographic speeds.

Tabular grains are preferably used in at least the emulsion layer with the maximum photographic speed among the two or more emulsion layers with the same color sensitivity. It is preferred that 60% or more of the total projected area of silver halide grains contained in at least one emulsion layer with the maximum photographic speed are occupied by tabular silver halide grains. More preferably, 70% or more of the total projected area are occupied by tabular silver halide grains. The tabular emulsion is used in at least one emulsion layer with the maximum speed having a color sensitivity of blue, green or red, but it is preferably used in at least two, more preferably all of the emulsion layers with the maximum photographic speeds each among the two or more emulsion layers with the same color sensitivity.

The aspect ratio of the tabular silver halide grains occupying 60% or more of the above total projected area is preferably 5 or more, more preferably 8 or more, and most preferably 10 or more. Although there is no particular upper limit with respect to the aspect ratio, it is assumed that the limit would be about 50 from the viewpoint of the current emulsion preparation technology.

In the present invention, the aspect ratio means the ratio of diameter to thickness of silver halides. That is, it is a quotient of the diameter divided by the thickness of each individual silver halide grain. The terminology "diameter" used herein refers to the diameter of a circle having an area equal to the projected area of grain as obtained when observing silver halide grains through a microscope or an electron microscope.

The method of taking a transmission electron micrograph by the replica technique and measuring the equivalent circle diameter and thickness of each individual grain can be mentioned as an example of aspect ratio determining method. In this method, the thickness is calculated from the length of the shadow of the replica.

The tabular silver halide grains for use in the present invention will now be described in greater detail.

The tabular grains have, as external surfaces, two mutually parallel main planes and side faces combining these main planes together. The tabular grains have one twin face or two or more mutually parallel twin faces. The twin face refers to the (111) face on both sides of which the ions of all the lattice points are in the relationship of reflected images. The tabular grains, as viewed in the direction perpendicular to the main planes of grains, have main planes in triangular or hexagonal form, or circular form corresponding to rounded triangular or hexagonal form, thereby providing triangular, hexagonal or circular tabular grains.

Now, the process for preparing tabular silver halide grains will be described.

The common process for preparing silver halide emulsions comprises first forming silver halide nuclei and thereafter performing the growth of silver halide grains until obtaining grains of desired size. The common process can also be employed in the present invention. The formation of tabular grains comprehends at least nucleation, ripening and growth steps.

These steps are described in detail in U.S. Pat. No. 4,945,037, the disclosure of which is incorporated herein by reference. The growth step is one comprising charging an aqueous solution of silver salt and a halide solution into a reaction vessel by the double jet method to thereby grow nuclei of silver halide grains. In the growth by the double jet method, use can be made of a method wherein the pAg of reaction solution is controlled.

The equivalent circle diameter of the tabular grains for use in the present invention is preferably in the range of 0.3 to 5.0 μm, more preferably 1.0 to 4.0 μm.

The tabular grains for use in the present invention are preferably monodispersed. The structure of monodispersed tabular grains and the process for producing the same are as described in, for example, JP-A-63-151618, the disclosure of which is incorporated herein by reference. A brief description of the configuration thereof is as follows. At least 70% of the total projected area of silver halide grains is occupied by tabular grains which are shaped like a hexagon having a ratio of the length of the side with the longest length to the length of the side with the shortest length of 2 or less and which have two mutually parallel planes as external surfaces. Moreover, the grain size distribution of hexagonal tabular grains is so monodispersed as to exhibit a variation coefficient (quotient of variation (standard deviation) of grain size expressed by the equivalent circle diameter of projected area thereof divided by an average grain size) of 20% or less. Preferably, the variation coefficient of grain size distribution is 18% or less.

The thickness of the tabular grains for use in the present invention is preferably less than about 0.8 μm, more preferably in the range of 0.05 to 0.6 μm, and most preferably in the range of 0.1 to 0.5 μm. The thickness distribution is preferably so monodispersed as to exhibit a variation coefficient of 20% or less.

The tabular silver halide grains for use in the present invention are constituted of silver iodobromide or silver chloroiodobromide.

The average silver iodide content of the tabular grains for use in the present invention is preferably in the range of 2 to 10 mol %.

The average silver iodide content can be determined by analyzing the composition of each individual grain by means of an X-ray microanalyzer. The average silver iodide content is an arithmetic means of silver iodide contents measured with respect to at least 100 emulsion grains by means of an X-ray microanalyzer. The method of measuring the silver iodide content of each individual grain is described in, for example, EP No. 147868A.

When the average silver iodide content of tabular grains is less than 2 mol %, an enhancement of ratio of speed/graininess by silver iodide cannot be expected. On the other hand, when the average silver iodide content exceeds 10 mol %, a lowering of chemical sensitization efficiency would be invited to thereby cause surfacing of such a problem that an increase of photographic speed cannot be attained.

The surface silver iodide content of the tabular silver halide grains for use in the present invention is preferably in the range of 1 to 4 mol %. The terminology "surface" used herein means a region of 50 angstroms or less from grain surface, i.e., region that can be detected by the XPS method described below.

The silver iodide content at grain surfaces can be measured by the XPS method (X-ray Photoelectron Spectroscopy).

The principle of the XPS method is described in detail in, for example, Junichi Aizawa, et al., "Denshi no Bunko (Spectroscopy of Electron)" (Kyoritsu Library 16, published by Kyoritsu Shuppan Co., Ltd. in 1978).

In the standard measuring method of XPS, Mg-Kα is used as excited X-rays, and the intensities of iodine (I) and silver (Ag) photoelectrons emitted from silver halide grains molded into appropriate specimen configuration are measured. The iodide content can be determined with the use of a calibration curve of iodine (I) vs. silver (Ag) photoelectron intensity ratio (intensity (I)/intensity (Ag)) as prepared using some types of standard specimens whose iodide contents are known. With respect to silver halide emulsions, gelatin adsorbed on the surface of silver halide grains must be decomposed and removed with the use of, for example, a protein-decomposing enzyme before performing the XPS measurement.

When the surface silver iodide content of tabular grains is less than 1 mol % or exceeds 4 mol %, a lowering of chemical sensitization efficiency would be invited to thereby cause surfacing of such problems that an enhancement of ratio of speed/graininess cannot be expected and that an increase of photographic speed cannot be attained.

It is preferred that the tabular silver halide grains for use in the present invention have dislocation lines.

The dislocation lines of tabular grains can be observed by the direct method using a transmission electron microscope at low temperatures as described in, for example, J. F. Hamilton, Photo. Sci. Eng., 11, 57 (1967) and T. Shiozawa, J. Soc. Photo. Sci. Japan, 35, 213 (1972).

Illustratively, silver halide grains are harvested from the emulsion with the care that the grains are not pressurized with such a force that dislocation occurs on the grains, are put on a mesh for electron microscope observation and, while cooling the specimen so as to prevent damaging (printout, etc.) by electron beams, are observed by the transmission method. The greater the thickness of the above grains, the more difficult the transmission of electron beams. Therefore, the use of an electron microscope of high voltage type (200 kV or more for 0.25 μm thickness) is preferred for ensuring clearer observation. Because whether or not dislocation lines can be seen depends on the specimen inclination angle against electron beams, for attaining appropriate dislocation line observation, the location of presence of dislocation lines must be identified by photographing given grains at as many specimen inclination angles as possible. The thus obtained photographs of grains enable determining the position and number of dislocation lines in each grain viewed in the direction perpendicular to the main planes.

In the silver halide grains of the present invention, dislocation lines are preferably present in portions extending from projected peripheral edges inward by 20% or less area, more preferably 10% or less area. The dislocation lines may be present in the vicinity of periphery and along the periphery, or may be localized in the vicinity of grain corners. The vicinity of grain corner refers to a three-dimensional portion surrounded by neighboring two sides making each apex and perpendiculars to the sides. Each of the perpendiculars starts at a point positioned on a line combining the grain center and the apex at x% of the length of the line from the grain center. The value of x is preferably in the range of 50 to less than 100, more preferably 75 to less than 100. The average number of provided dislocation lines is preferably 10 or more, more preferably 20 or more per grain.

For the introduction of dislocation lines, use can be made of the method of JP-A-63-220238 in which aqueous solutions of $Ag^+$ ions and $I^-$ ions are added by the double jet method to thereby form a silver halide layer containing silver iodide. Also, use can be made of the method of JP-A-11-15088 in which AgI fine grains are rapidly added, followed by shell formation, or the method of U.S. Pat. No. 5,496,694 in which a silver halide layer containing silver iodide is formed while rapidly adding iodide ions with the use of an iodide ion-releasing agent. Further, use can be made of the method of JP-A-4-14951 or JP-A-9-189974 in which dislocation lines are selectively introduced in specified sites of silver halide grains.

In the color photographic lightsensitive material of the present invention, the silver halide emulsion contained in at least one of the blue-sensitive silver halide emulsion layer with the maximum photographic speed, the green-sensitive silver halide emulsion layer with the maximum photographic speed and the red-sensitive silver halide emulsion layer with the maximum photographic speed, has a grain number of preferably 1.00 or less, more preferably 0.90 or less, and most preferably 0.80 or less.

In connection with the average equivalent circle diameter ($D_c$: $\mu$m) of tabular silver halide grains contained in each layer with the maximum photographic speed among a plurality of emulsion layers with the same color sensitivity, the average thickness ($T_h$: $\mu$m) of such tabular grains and the silver coating amount of such silver halide grains ($A_H$: g/m$^2$), the grain number is expressed by the formula:

$$\text{grain number} = A_H/(D_c^2 \times T_h) \quad \text{(I)}$$

The value of ($D_c^2 \times T_h$) correlates with the volume of tabular silver halide grains, and a quotient of silver coating amount divided by $D_c^2 \times T_h$ is the grain number. That is, the grain number can be regarded as being a value which correlates the number of grains contained in each emulsion layer.

Surprisingly, the inventor has found that the grain number of tabular grains of 5 or more aspect ratio employed in each of maximum-speed emulsion layers with different color sensitivities correlates with the realization of a silver halide color photographic lightsensitive material which realized high speed and high image quality (especially, high sharpness).

It has been surprising that, when tabular grains are used in each color-sensitive maximum-speed emulsion layer, a color lightsensitive material simultaneously ensuring high speed, high image quality and excellent storage life can be obtained by selecting an employed silver amount in conformity with the grain size, in particular, equivalent circle diameter and thickness of tabular grains contained in the emulsion layer. This suggests that desirable performance can be attained by restricting the total number of maximum-speed tabular grains used in each maximum-speed emulsion layer to a certain level or less in place of simply reducing the amount of silver employed.

Even if tabular grains are employed in each maximum-speed emulsion layer, at least one performance among the speed, image quality and storage life would be deteriorated when the grain number exceeds 1.00.

Furthermore, when, with respect to even any one of the blue-sensitive, green-sensitive and red-sensitive emulsion layers with the maximum photographic speeds, the grain number exceeds 1.00, at least one performance among the speed, image quality and storage life would be deteriorated.

Therefore, it is preferable that a number of the maximum-speed emulsion layer containing the tabular grains whose grain number is 1.00 or less is as many as possible. Specifically, it is more preferable that all of the blue-, green- and red-sensitive emulsion layers with the maximum speeds contain the tabular grains whose grain number is 1.00 or less.

A mixture of a plurality of silver halide emulsions, for example, prepared by separate production processes, the emulsions containing silver halide grains of different average grain sizes, may be used in each of maximum-speed emulsion layers with different color sensitivities of the color photographic lightsensitive material which can be employed in the lens-fitted film unit of the present invention. In that instance, it is preferred that 60% or more of the projected area of all the grains contained in the emulsion with the maximum average equivalent sphere diameter among mixed emulsions consist of tabular grains of 5 or more aspect ratio, and that the grain number calculated from the silver coating amount ($A_H$), average equivalent circle diameter ($D_c$) and average thickness ($T_h$) with respect to the emulsion with the maximum average equivalent sphere diameter be 1.00 or less.

When each maximum-speed emulsion layer contains a plurality of silver halide emulsions having different average grain sizes, the ratio of emulsion with the maximum average equivalent sphere diameter to all the emulsions contained in the maximum-speed emulsion layer is preferably 50% by weight or more, more preferably 70% by weight or more, in terms of silver amount.

Herein, the equivalent sphere diameter refers to the diameter of a sphere having a volume equal to that of each individual grain.

Although the mixed silver halide grains other than those of the largest size in terms of equivalent sphere diameter contained in each maximum-speed layer include grains of regular crystals such as cubic, octahedral and tetradecahedral crystals, tabular grains having (111) faces as main planes, tabular grains whose main planes consist of (100) faces and epitaxial grains, and the configuration thereof is not particularly limited, it is preferred that such mixed silver halide grains be tabular grains. With respect to these tabular grains, it is preferred that 60% or more of the projected area thereof consist of tabular grains of 5 or more aspect ratio, that the halide composition thereof correspond to that of silver iodobromide or silver chloroiodobromide, and that the tabular grains have 10 or more dislocation lines per grain. The grain number calculated from the employed silver amount, $D_c$ and $T_h$ with respect to these tabular grains is preferably 1.00 or less.

In color photographic lightsensitive materials wherein the emulsion layers with the same color sensitivity are constituted of a plurality of emulsion layers with different photographic speeds, it has been a general knowledge for obtaining a color photographic lightsensitive material ensuring high image quality, that designing a lightsensitive material having an increased silver content of high-speed emulsion layer so that the advantage of the so-termed graininess vanishing effect can be taken. However, with respect to color photographic lightsensitive materials with especially high speeds, an increase of silver content of high-speed emulsion layer causes the deterioration with the passage of time by storage to be more serious than an increase of silver content of low-speed emulsion layer. Accordingly, the performance deterioration after storage of high-speed color photographic lightsensitive material, attributed to the influence of natural radiation, can preferably be suppressed to a level of practically no problem by lowering the silver content of the maximum-speed emulsion layer among emulsion layers with the same color sensitivity.

In one embodiment of the present invention, with respect to the photographic film to be charged in the lens-fitted film unit of the present invention, the silver content of each of the red-sensitive emulsion layer with the maximum photographic speed, green-sensitive emulsion layer with the maximum photographic speed and blue-sensitive emulsion layer with the maximum photographic speed is preferably in the range of 0.3 to 1.3 $g/m^2$, more preferably 0.3 to 1.2 $g/m^2$.

In another embodiment of the present invention, with respect to the photographic film to be charged in the lens-fitted film unit of the present invention, the total silver content of the red-sensitive emulsion layer with the maximum photographic speed, green-sensitive emulsion layer with the maximum photographic speed and blue-sensitive emulsion layer with the maximum photographic speed is preferably in the range of 1.5 to 3.5 $g/m^2$, more preferably 1.5 to 3.0 $g/m^2$.

The total silver content of the photographic film to be charged in the lens-fitted film unit of the present invention is preferably in the range of 3.0 to 9.0 $g/m^2$, more preferably 3.0 to 8.0 $g/m^2$.

The terminology "silver content" used herein means the total amount, in terms of silver, of all contained silvers such as silver halides and metallic silver. Some methods are known for analyzing the silver content of lightsensitive material. Although any of the methods can be employed, for example, the elemental analysis using fluorescent X-ray technique is easy to apply.

With respect to the photographic lightsensitive material of the present invention and the emulsion suitable for use in the photographic lightsensitive material and also with respect to layer arrangement and related techniques, silver halide emulsions, dye forming couplers, DIR couplers and other functional couplers, various additives and development processing which can be used in the photographic lightsensitive material, reference can be made to EP 0565096A1 (published on Oct. 13, 1993) and patents cited therein, the disclosures of which are incorporated herein by reference. Individual particulars and the locations where they are described will be listed below.

1. Layer arrangement: page 61 lines 23 to 35, page 61 line 41 to page 62 line14,
2. Interlayers: page 61 lines 36 to 40,
3. Interlayer effect imparting layers: page 62 lines 15 to 18,
4. Silver halide halogen compositions: page 62 lines 21 to 25,
5. Silver halide grain crystal habits: page 62 lines 26 to 30,
6. Silver halide grain sizes: page 62 lines 31 to 34,
7. Emulsion production methods: page 62 lines 35 to 40,
8. Silver halide grain size distributions: page 62 lines 41 to 42,
9. Tabular grains: page 62 lines 43 to 46,
10. Internal structures of grains: page 62 lines 47 to 53,
11. Latent image forming types of emulsions: page 62 line 54 to page 63 to line 5,
12. Physical ripening and chemical sensitization of emulsion: page 63 lines 6 to 9,
13. Emulsion mixing: page 63 lines 10 to 13,
14. Fogging emulsions: page 63 lines 14 to 31,
15. Nonlightsensitive emulsions: page 63 lines 32 to 43,
16. Silver coating amounts: page 63 lines 49 to 50,
17. Formaldehyde scavengers: page 64 lines 54 to 57,
18. Mercapto antifoggants: page 65 lines 1 to 2,
19. Fogging agent, etc.-releasing agents: page 65 lines 3 to 7,
20. Dyes: page 65, lines 7 to 10,
21. Color coupler summary: page 65 lines 11 to 13,
22. Yellow, magenta and cyan couplers: page 65 lines 14 to 25,
23. Polymer couplers: page 65 lines 26 to 28,
24. Diffusive dye forming couplers: page 65 lines 29 to 31,
25. Colored couplers: page 65 lines 32 to 38,
26. Functional coupler summary: page 65 lines 39 to 44,
27. Bleaching accelerator-releasing couplers: page 65 lines 45 to 48,
28. Development accelerator-releasing couplers: page 65 lines 49 to 53,
29. Other DIR couplers: page 65 line 54 to page 66 to line 4,
30. Method of dispersing couplers: page 66 lines 5 to 28,
31. Antiseptic and mildewproofing agents: page 66 lines 29 to 33,
32. Types of sensitive materials: page 66 lines 34 to 36,
33. Thickness of lightsensitive layer and swelling speed: page 66 line 40 to page 67 line 1,
34. Back layers: page 67 lines 3 to 8,
35. Development processing summary: page 67 lines 9 to 11,
36. Developing solution and developing agents: page 67 lines 12 to 30,
37. Developing solution additives: page 67 lines 31 to 44,
38. Reversal processing: page 67 lines 45 to 56,
39. Processing solution open ratio: page 67 line 57 to page 68 line 12,
40. Development time: page 68 lines 13 to 15,
41. Bleach-fix, bleaching and fixing: page 68 line 16 to page 69 line 31,
42. Automatic processor: page 69 lines 32 to 40,
43. Washing, rinse and stabilization: page 69 line 41 to page 70 line 18,
44. Processing solution replenishment and recycling: page 70 lines 19 to 23,
45. Developing agent built-in sensitive material: page 70 lines 24 to 33, and
46. Development processing temperature: page 70 lines 34 to 38.

EXAMPLES

The examples of the invention are set froth below. However, the present invention is not limited to there examples.

Example 1

Preparation Method of Em-E 1300 mL of an aqueous solution containing 1.6 g of a low-molecular-weight gelatin whose weight average molecular weight was 15,000 and 1.0 g of KBr was vigorously agitated while maintaining the temperature at 58° C. and adjusting the pH at 9.

An aqueous solution containing 1.3 g of AgNO$_3$ and an aqueous solution containing 1.1 g of KBr and 0.7 g of a low-molecular-weight acid-treated gelatin whose weight average molecular weight was 15,000 were added by the double jet method over a period of 30 sec to thereby effect a nucleation. 6.6 g of KBr was added and heated to 78° C., and the mixture was ripened.

After the completion of ripening, 15.0 g of alkali-treated gelatin whose weight average molecular weight was 100,000 which was chemically modified with anhydrous succinic acid was added, and the pH was adjusted to 5.5. 230 mL of aqueous solution containing 29.3 g of AgNO$_3$ and an aqueous solution containing 15.8 g of KBr and 1.92 g of KI were added by the double jet method over a period of 30 min. During this period, the silver potential was maintained at –20 mV against saturated calomel electrode. Further, an aqueous solution containing 64.5 g of AgNO$_3$ and 233 mL of aqueous solution containing 42.3 g of KBr and 5.14 g of KI were added by the double jet method over a period of 37 min while increasing the flow rate so that the final flow rate was 1.33 times the initial flow rate. During this period the silver potential was maintained at –20 mV. Next, an aqueous solution containing 70.8 g of AgNO$_3$ and an aqueous KBr solution were added by the double jet method over a period of 35 min while maintaining the silver potential at –10 mV.

After the temperature was decreased to 40° C., 14.9 f of Compound 1 was added, and 32 mL of 0.8M aqueous solution of sodium sulfite was further added. Next, pH was adjusted to 9.0 by using a NaOH solution, and maintained the pH for 5 min. After the temperature was raised to 55° C., pH was adjusted to 5.5 by using H$_2$SO$_4$. 1 mg of sodium benzenethiosulfonate was added, and 13 g of lime-processed gelatin having a calcium concentration of 1 ppm was added. After the completion of the addition, 250 mL of aqueous solution containing 71.0 g of AgNO$_3$ and an aqueous KBr solution were added over a period of 20 min while maintaining the silver potential at +75 mV. During this period, yellow prussiate and K$_2$IrCl$_6$ were added in amounts of $1.0 \times 10^{-5}$ mol per mol of silver and $1 \times 10^{-8}$ mol per mol of silver, repectively.

After the mixture was washed with water, 80 g of gelatin was added. The pH and pAg were adjusted at 40° C. to 6.5 and 8.8, respectively. After raising the temperature to 56° C., Compound 2 and Sensitizing dyes ExS-5, ExS-6, ExS-7, ExS-8 and ExS-9 were added, then optimally sensitized the mixture by adding potassium thiocyanate, chloroauric acid, sodium thiosulfate, hexafluorophenyldiphenylphosphine selenide, Compound F-11 and Compound 3. After the completion of the chemical sensitization, Compound F-2 was added.

The emulsion were tabular grains having an average equivalent sphere diameter of 1.33 μm, average equivalent circle diameter of 2.63 μm, and an average aspect ratio of 11.4.

The thus obtained grains were cooled with liquid nitrogen and observed through transmission electron microscope. It was revealed that grains having no dislocation lines within 80% with respect to the projected area from the grain center occupied about 90% of all the grains, and 10 or more dislocation lines per grain were observed at grain periphery portion ranging 20% with respect to the projected area from the grain periphery.

Preparation Method of Emulsion Em-K

Preparation of a Seed Emulsion 1200 mL of an aqueous solution containing 1.0 g of a low-molecular-weight acid-treated gelatin whose weight average molecular weight was 15,000 and 0.9 g of KBr was vigorously agitated while maintaining the temperature at 35° C. 40 mL of aqueous solution containing 1.85 g of AgNO$_3$ and 35 mL of aqueous solution containing 1.82 g of KBr and 1.0 g of a low-molecular-weight gelatin whose molecular weight was 15,000 were added by the double jet method over a period of 30 sec to thereby effect a nucleation. Immediately after the completion of the addition, 5.4 g of KBr was added and heated to 75° C., and the mixture was ripened. After the completion of ripening, 35 g of alkali-treated gelatin having a weight average molecular weight of 100,000 which was chemically modified with anhydrous succinic acid was added, and pH was adjusted to 5.5. 250 mL of aqueous solution containing 36 g of AgNO$_3$ and 282 mL of aqueous solution containing 21.2 g of KBr and 2.81 g of KI were added by the double jet method over a period of 25 min, while the silver potential was maintained at –5 mV. Then, 650 mL of aqueous solution containing 200 g of AgNO$_3$ and 900 mL of aqueous solution containing 134.1 g of KBr and 13.9 g of KI were added by the double jet method over a period of 100 min while increasing the flow rate so that the final flow rate was 1.4 times the initial flow rate. During this period, the silver potential was maintained at +5 mV against saturated calomel electrode. After washing with water, gelatin was added, pH and pAg were adjusted to 5.7 and 8.8, respectively, the weight in terms of silver per kg of the emulsion was adjusted to 139.0 g, and gelatin weight was adjusted to 56 g, thereby preparing a seed emulsion.

1200 mL of aqueous solution containing 33 g of lime-treated gelatin having a calcium concentration of 1 ppm and 3.4 g of KBr was vigorously agitated while maintaining the temperature at 75° C. After 89 g of the above mentioned seed emulsion was added, 0.3 g of modified silicone oil (L7602 manufactured by Nippon Uniker K.K.) was added. The pH was adjusted to 5.8 by adding H$_2$SO$_4$, 2 mg of sodium benzenethiosulfonate and 2 mg of thiourea dioxide were added, then, 600 mL of aqueous solution containing 51.0 g of AgNO$_3$ and 600 mL of aqueous solution containing 36.2 g of KBr and 3.49 g of KI were added by the double jet method over a period of 85 min so that the final flow rate was 1.1 times the initial flow rate. During this period, the silver potential was maintained at –35 mV against saturated calomel electrode. Further, 300 mL of aqueous solution containing 44.7 g of AgNO$_3$ and 300 mL of aqueous solution containing 30.6 g of KBr and 3.06 g of KI were added by the double jet method over a period of 56 min so that the final flow rate was 1.1 times the initial flow rate. During this period, the silver potential was maintained at –35 mV against saturated calomel electrode. Next, 180 mL of aqueous solution containing 36.9 g of AgNO$_3$ and an aqueous KBr solution were added by the double jet method over a period of 40 min. During this period, the silver potential was maintained at +10 mV against saturated calomel electrode. After adjusting the silver potential at –70 mV by an addition of KBr, 1.38 g, in terms of KI weight, of AgI fine grain emulsion having grain size of 0.037 μm was added. Immediately after the addition, 100 mL of aqueous solution containing 17.4 g of AgNO$_3$ was added over 15 min. After washing with water, gelatin was added and the pH and pAg was adjusted at 5.8 and 8.7, respectively at 40° C. After raising the temperature to 60° C., Compound 2 and Sensitizing dyes ExS-10 and ExS-13 were added, and optimally chemically sensitized by adding potassium thiocyanate, chloroauric acid, sodium thiosulfate, hexafluorophenyldiphenylphosphine selenide, Compound F-11 and Compound 3. At the completion of the chemical sensitization, Compound F-3 was added.

The emulsion were tabular grains having an average equivalent sphere diameter of 1.65 μm, average equivalent circle diameter of 3.10 μm, and an average aspect ratio of 10.0.

The thus obtained grains were cooled with liquid nitrogen and observed through transmission electron microscope. It was revealed that grains having no dislocation lines within 80% with respect to the projected area from the grain center occupied about 98% of all the grains, and 10 or more dislocation lines per grain were observed at grain periphery portion ranging 20% with respect to the projected area from the grain periphery.

Preparation Method of Emulsion Em-N 1250 mL of aqueous solution containing 48 g of de-ionized gelatin and 0.75 g of KBr was vigorously stirred while maintaining the temperature at 75° C.

276 mL of aqueous solution containing 12.0 g of $AgNO_3$ and an aqueous KBr solution of the equimolar concentration were added to the solution by the double jet method over 7 min while maintaining pAg at 7.26. Next, 600 mL of aqueous solution containing 108.0 g of $AgNO_3$ and a mixed aqueous solution of KBr and KI of the equimolar concentration (2.0 mol % of KI) were added over 18 min 30 sec while maintaining pAg at 7.30. During the addition, 18.0 mL of aqueous solution of 0.1 wt % thiosulfonic acid was added 5 min before the completion of the addition. After desalting by a conventional flocculation method, water washing and re-dispersion were conducted, and pH and pAg were adjusted to 6.2 and 7.6, respectively at 40° C. After controlling the temperature to 40° C., Compound 2 and Sensitizing dyes ExS-10 and ExS-12 were added, and potassium thiocyanate, chloroauric acid, sodium thiosulfate, hexafluorophenyldiphenylphosphine selenide, Compound F-11 and Compound 3 were added. After raising the temperature to 68° C., chemical sensitization was performed optimally. At the completion of the sensitization, Compound F-2 was added.

The thus obtained emulsion was cubic grains having equivalent sphere diameter of 0.19 μm and a coefficient of variation of the equivalent sphere diameter of 14%.

Emulsions Em-A to Em-M and other emulsions were prepared by properly changing the temperatures, pH's, silver potentials, amounts of silver nitrate, amounts of KI, amounts of compounds, kind of sensitizing dyes, and amounts of seed emulsion employed in the preparation of the above emulsions Em-E and Em-K.

Summery of the thus prepared emulsion are set forth in Table 1.

TABLE 1

| Emulsion | E.C.D. $D_c$(μm) | Grain thickness $T_h$(μm) | A.R. $D_c/T_h$ | E.S.D. (μm) | Av. AgI content (mol %) | Surface AgI content (mol %) | Grain shape | Dislocation line (number/grain) |
|---|---|---|---|---|---|---|---|---|
| Em-A | 2.50 | 0.25 | 10.0 | 1.33 | 5.5 | 2.2 | Tabular | More than 10 |
| Em-B | 1.50 | 0.15 | 10.0 | 0.80 | 5.0 | 3.0 | Tabular | More than 10 |
| Em-C | 0.85 | 0.12 | 7.1 | 0.51 | 4.7 | 4.0 | Tabular | More than 10 |
| Em-D | 0.40 | 0.15 | 2.7 | 0.35 | 3.9 | 3.0 | Tabular | More than 10 |
| Em-E | 2.63 | 0.23 | 11.4 | 1.33 | 5.0 | 2.3 | Tabular | More than 10 |
| Em-F | 2.00 | 0.14 | 14.3 | 0.92 | 5.0 | 3.2 | Tabular | More than 10 |
| Em-G | 1.60 | 0.13 | 12.3 | 0.79 | 5.5 | 3.5 | Tabular | More than 10 |
| Em-H | 0.85 | 0.12 | 7.1 | 0.51 | 4.7 | 4.0 | Tabular | More than 10 |
| Em-I | 0.58 | 0.18 | 3.2 | 0.45 | 3.7 | 3.5 | Tabular | More than 10 |
| Em-J | 2.00 | 0.14 | 14.3 | 0.92 | 5.0 | 3.2 | Tabular | More than 10 |
| Em-K | 3.10 | 0.31 | 10.0 | 1.65 | 5.6 | 3.0 | Tabular | More than 10 |
| Em-L | 1.25 | 0.29 | 4.3 | 0.89 | 6.5 | 5.0 | Tabular | More than 10 |
| Em-M | 0.55 | 0.12 | 4.6 | 0.37 | 3.7 | 3.5 | Tabular | More than 10 |
| Em-N | — | — | — | 0.19 | 1.8 | 1.8 | Cubic | — |

E.C.D. = Equivalent Circle Diameter
A.R. = Aspect Ratio
E.S.D = Equivalent sphere Diameter Preparation of Coated Samples Sample 001 of a multi-layered color lightsensitive material was prepared by laminatedly coating each layer having the composition set forth below, on an under coated cellulose triacetate film support.

Composition of Lightsensitive Layer

Main materials used in each of the layers are classified as follows:

| | |
|---|---|
| ExC: cyan coupler, | ExS: Spectral sensitizing dye, |
| UV: ultraviolet absorber, | ExM: magenta coupler, |
| HBS: high b.p. org. solvent, | ExY: yellow coupler, |
| H: gelatin hardener. | |

(For each specific compound, in the following description, numeral is assigned after the character, and the formula is shown later).

The numeric value given beside the description of each component is for the coating amount expressed in the unit of $g/m^2$. With respect to the silver halide, the coating amount is in terms of silver quantity. And with respect to spectral sensitizing dyes, the coating amount is in terms of mol per mol of silver halide in the same layer.

| 1st layer (First antihalation layer) | | |
|---|---|---|
| Black colloidal silver | silver | 0.070 |
| Gelatin | | 0.660 |
| ExM-1 | | 0.048 |
| Cpd-2 | | 0.001 |

| | | |
|---|---|---|
| F-8 | | 0.001 |
| HBS-1 | | 0.090 |
| HBS-2 | | 0.010 |
| 2nd layer (Second antihalation layer) | | |
| Black colloidal silver | silver | 0.090 |
| Gelatin | | 0.830 |
| ExM-1 | | 0.057 |
| ExF-1 | | 0.002 |
| F-8 | | 0.001 |
| HBS-1 | | 0.090 |
| HBS-2 | | 0.010 |
| 3rd layer (interlayer) | | |
| ExC-2 | | 0.010 |
| Cpd-1 | | 0.086 |
| UV-2 | | 0.029 |
| UV-3 | | 0.052 |
| UV-4 | | 0.011 |
| HBS-1 | | 0.100 |
| Gelatin | | 0.580 |
| 4th layer (Low-speed red-sensitive emulsion layer) | | |
| Em-D | silver | 0.61 |
| Em-C | silver | 0.51 |
| ExC-1 | | 0.222 |
| ExC-2 | | 0.010 |
| ExC-3 | | 0.072 |
| ExC-4 | | 0.148 |
| ExC-5 | | 0.005 |
| ExC-6 | | 0.008 |
| ExC-8 | | 0.071 |
| ExC-9 | | 0.010 |
| ExS-1 | | $1.4 \times 10^{-3}$ |
| ExS-2 | | $6.0 \times 10^{-4}$ |
| ExS-3 | | $2.0 \times 10^{-5}$ |
| UV-2 | | 0.036 |
| UV-3 | | 0.067 |
| UV-4 | | 0.014 |
| Cpd-2 | | 0.010 |
| Cpd-4 | | 0.012 |
| HBS-1 | | 0.240 |
| HBS-5 | | 0.010 |
| Gelatin | | 1.630 |
| 5th layer (Medium-speed red-sensitive emulsion layer) | | |
| Em-B | silver | 0.66 |
| ExC-1 | | 0.111 |
| ExC-2 | | 0.039 |
| ExC-3 | | 0.018 |
| ExC-4 | | 0.074 |
| ExC-5 | | 0.019 |
| ExC-6 | | 0.024 |
| ExC-8 | | 0.010 |
| ExC-9 | | 0.005 |
| ExS-1 | | $6.3 \times 10^{-4}$ |
| ExS-2 | | $2.6 \times 10^{-4}$ |
| ExS-3 | | $8.7 \times 10^{-6}$ |
| Cpd-2 | | 0.020 |
| Cpd-4 | | 0.021 |
| HBS-1 | | 0.129 |
| Gelatin | | 0.900 |
| 6th layer (High-speed red-sensitive emulsion layer) | | |
| Em-A | silver | 1.29 |
| ExC-1 | | 0.122 |
| ExC-6 | | 0.032 |
| ExC-8 | | 0.110 |
| ExC-9 | | 0.005 |
| ExC-10 | | 0.159 |
| ExS-1 | | $3.2 \times 10^{-4}$ |
| ExS-2 | | $2.6 \times 10^{-4}$ |
| ExS-3 | | $8.8 \times 10^{-6}$ |
| Cpd-2 | | 0.068 |
| Cpd-4 | | 0.015 |
| HBS-1 | | 0.440 |
| Gelatin | | 1.610 |
| 7th layer (Interlayer) | | |
| Cpd-1 | | 0.081 |
| Cpd-6 | | 0.002 |
| Solid disperse dye ExF-4 | | 0.015 |
| HBS-1 | | 0.049 |
| Polyethyl acrylate latex | | 0.088 |
| Gelatin | | 0.759 |
| 8th layer (Layer capable of exerting interlayer effect on red-sensitive layer) | | |
| Em-J | silver | 0.39 |
| Cpd-4 | | 0.010 |
| ExM-2 | | 0.082 |
| ExM-3 | | 0.006 |
| ExM-4 | | 0.026 |
| ExY-1 | | 0.010 |
| ExY-4 | | 0.040 |
| ExC-7 | | 0.007 |
| ExS-4 | | $7.0 \times 10^{-4}$ |
| ExS-5 | | $2.5 \times 10^{-4}$ |
| HBS-1 | | 0.203 |
| HBS-3 | | 0.003 |
| HBS-5 | | 0.010 |
| Gelatin | | 0.570 |
| 9th layer (Low-speed green-sensitive emulsion layer) | | |
| Em-H | silver | 0.23 |
| Em-G | silver | 0.15 |
| Em-I | silver | 0.26 |
| ExM-2 | | 0.388 |
| ExM-3 | | 0.040 |
| ExY-1 | | 0.003 |
| ExY-3 | | 0.002 |
| ExC-7 | | 0.009 |
| ExS-5 | | $3.0 \times 10^{-4}$ |
| ExS-6 | | $8.4 \times 10^{-5}$ |
| ExS-7 | | $1.1 \times 10^{-4}$ |
| ExS-8 | | $4.5 \times 10^{-4}$ |
| ExS-9 | | $1.3 \times 10^{-4}$ |
| HBS-1 | | 0.337 |
| HBS-3 | | 0.018 |
| HBS-4 | | 0.260 |
| HBS-5 | | 0.110 |
| Cpd-5 | | 0.010 |
| Gelatin | | 1.470 |
| 10th layer (Medium-speed green-sensitive emulsion layer) | | |
| Em-F | silver | 0.38 |
| ExM-2 | | 0.084 |
| ExM-3 | | 0.012 |
| ExM-4 | | 0.005 |
| ExY-3 | | 0.002 |
| ExC-6 | | 0.003 |
| ExC-7 | | 0.007 |
| ExC-8 | | 0.008 |
| ExS-7 | | $1.0 \times 10^{-4}$ |
| ExS-8 | | $7.1 \times 10^{-4}$ |
| ExS-9 | | $2.0 \times 10^{-4}$ |
| HBS-1 | | 0.096 |
| HBS-3 | | 0.002 |
| HBS-5 | | 0.002 |
| Cpd-5 | | 0.004 |
| Gelatin | | 0.382 |
| 11th layer (High-speed green-sensitive emulsion layer) | | |
| Em-E | silver | 0.92 |
| ExC-6 | | 0.002 |
| ExC-8 | | 0.010 |
| ExM-1 | | 0.014 |
| ExM-2 | | 0.023 |
| ExM-3 | | 0.023 |
| ExM-4 | | 0.005 |
| ExM-5 | | 0.040 |
| ExY-3 | | 0.003 |
| ExS-7 | | $8.4 \times 10^{-4}$ |
| ExS-8 | | $5.9 \times 10^{-4}$ |
| ExS-9 | | $1.7 \times 10^{-4}$ |

-continued

| | | |
|---|---|---|
| Cpd-3 | | 0.004 |
| Cpd-4 | | 0.007 |
| Cpd-5 | | 0.010 |
| HBS-1 | | 0.259 |
| HBS-5 | | 0.020 |
| Polyethyl acrylate latex | | 0.099 |
| Gelatin | | 0.781 |
| 12th layer (Yellow filter layer) | | |
| Cpd-1 | | 0.088 |
| Solid disperse dye ExF-2 | | 0.051 |
| Solid disperse dye ExF-8 | | 0.010 |
| HBS-1 | | 0.049 |
| Gelatin | | 0.593 |
| 13th layer (Low-speed blue-sensitive emulsion layer) | | |
| Em-N | silver | 0.12 |
| Em-M | silver | 0.09 |
| Em-L | silver | 0.50 |
| ExC-1 | | 0.024 |
| ExC-7 | | 0.011 |
| ExY-1 | | 0.002 |
| ExY-2 | | 0.956 |
| ExY-4 | | 0.091 |
| ExS-10 | | $8.5 \times 10^{-5}$ |
| ExS-11 | | $6.4 \times 10^{-4}$ |
| ExS-12 | | $8.5 \times 10^{-5}$ |
| ExS-13 | | $5.0 \times 10^{-4}$ |
| Cpd-2 | | 0.037 |
| Cpd-3 | | 0.004 |
| HBS-1 | | 0.372 |
| HBS-5 | | 0.047 |
| Gelatin | | 2.201 |
| 14th layer (High-speed blue-sensitive emulsion layer) | | |
| Em-K | silver | 1.16 |
| ExY-2 | | 0.235 |
| ExY-4 | | 0.018 |
| ExS-10 | | $1.5 \times 10^{-4}$ |
| ExS-13 | | $2.0 \times 10^{-4}$ |
| Cpd-2 | | 0.075 |
| Cpd-3 | | 0.001 |
| HBS-1 | | 0.087 |
| Gelatin | | 1.156 |
| 15th layer (1st protective layer) | | |
| 0.07 μm silver iodobromide emulsion | silver | 0.28 |
| UV-1 | | 0.358 |
| UV-2 | | 0.179 |
| UV-3 | | 0.254 |
| UV-4 | | 0.025 |
| F-11 | | 0.0081 |
| S-1 | | 0.078 |
| ExF-5 | | 0.0024 |
| ExF-6 | | 0.0012 |
| ExF-7 | | 0.0010 |
| HBS-1 | | 0.175 |
| HBS-4 | | 0.050 |
| Gelatin | | 2.231 |
| 16th layer (2nd protective layer) | | |
| H-1 | | 0.400 |
| B-1 (diameter 1.7 μm) | | 0.050 |
| B-2 (diameter 1.7 μm) | | 0.150 |
| B-3 | | 0.050 |
| S-1 | | 0.200 |
| Gelatin | | 0.711 |

In addition to the above components, W-1 to W-6, B-4 to B-6, F-1 to F-17, a lead salt, a platinum salt, an iridium salt and a rhodium salt were appropriately added to the individual layers in order to improve the storage life, processability, resistance to pressure, antiseptic and mildewproofing properties, antistatic properties and coating property thereof.

Preparation of dispersion of organic solid disperse dye:

The ExF-2 of the 12th layer was dispersed by the following method. Specifically,

| | |
|---|---|
| Wet cake of ExF-2 (contg.17.6 wt. % water) | 2.800 kg |
| Sodium octylphenyldiethoxymethanesulfonate (31 wt. % aq. soln.) | 0.376 kg |
| F-15 (7% aq. soln.) | 0.011 kg |
| Water | 4.020 kg |
| Total | 7.210 kg |

(adjusted to pH=7.2 with NaOH).

Slurry of the above composition was agitated by means of a dissolver to thereby effect a preliminary dispersion, and further dispersed by means of agitator mill LMK-4 under such conditions that the peripheral speed, delivery rate and packing ratio of 0.3 mm-diameter zirconia beads were 10 m/s, 0.6 kg/min and 80%, respectively, until the absorbance ratio of the dispersion became 0.29. Thus, a solid particulate dispersion was obtained, wherein the average particle diameter of dye particulate was 0.29 μm.

Solid dispersions of ExF-4 and ExF-8 were obtained in the same manner. The average particle diameters of these dye particulates were 0.28 μm and 0.49 μm, respectively.

The compounds used in the preparation of each of the layers will be listed below.

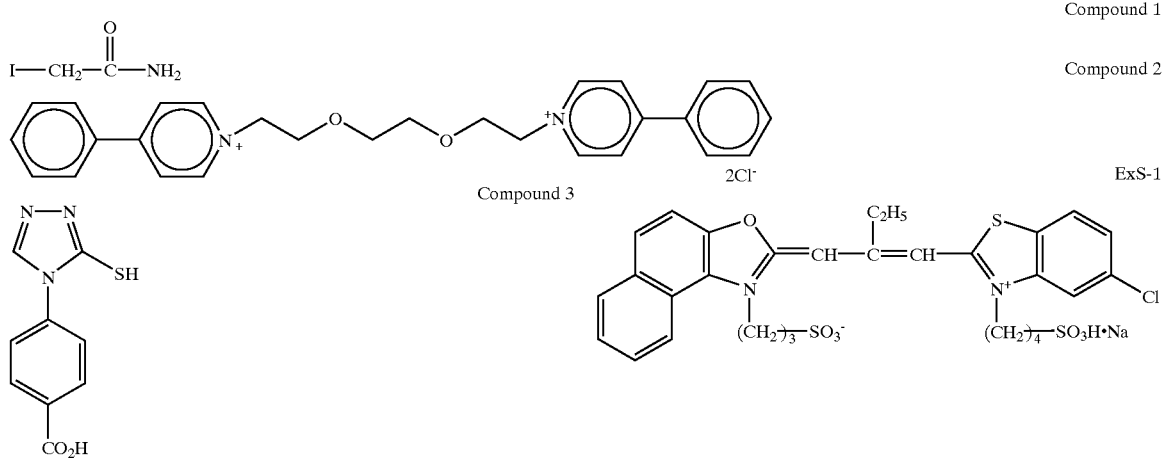

-continued
ExS-2
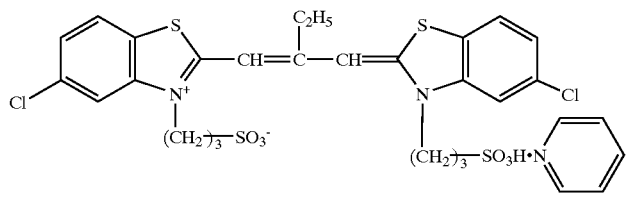
ExS-3
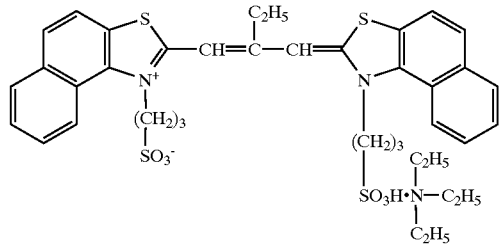
ExS-4
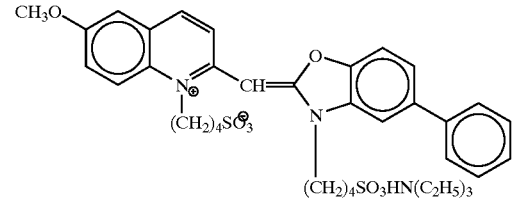
ExS-5
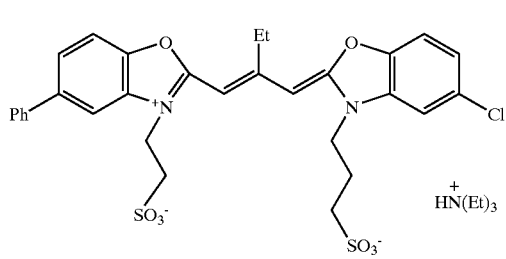
ExS-6
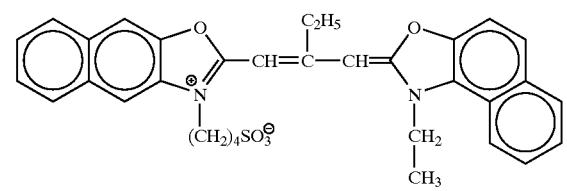
ExS-7
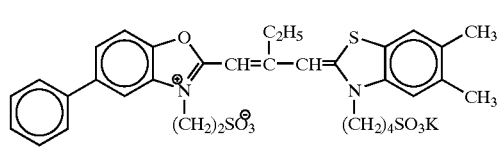
ExS-8
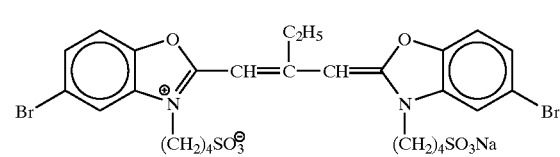
ExS-9
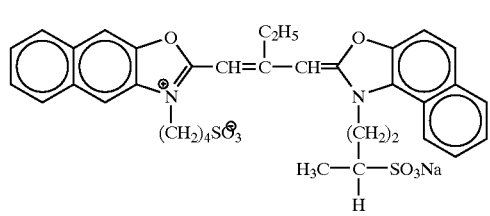
ExS-10
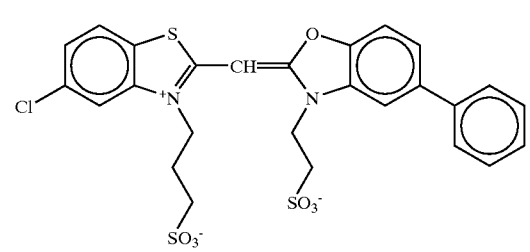
ExS-11
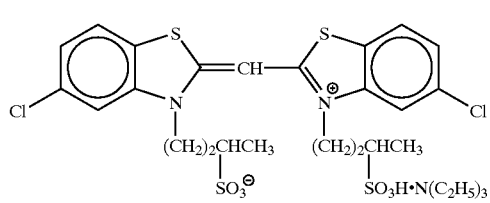
ExS-12
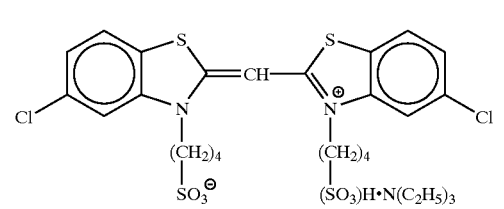
ExS-13
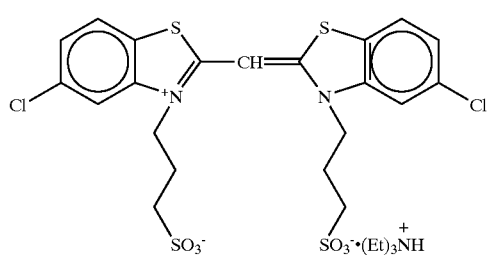
ExC-1
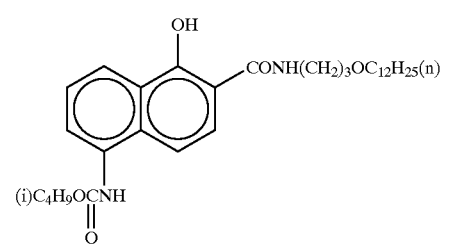

ExC-2
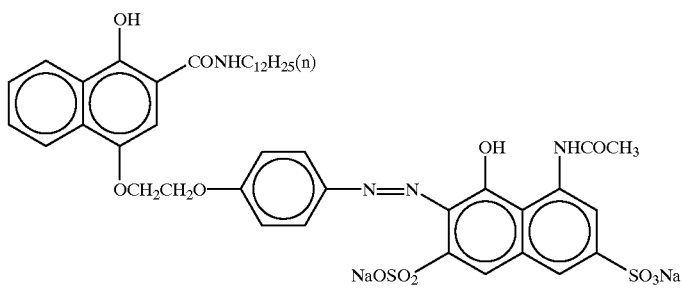
ExC-3
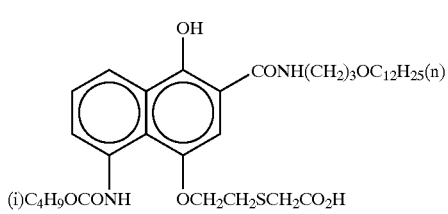
ExC-4
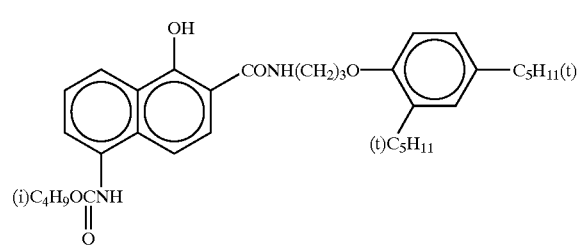
ExC-5
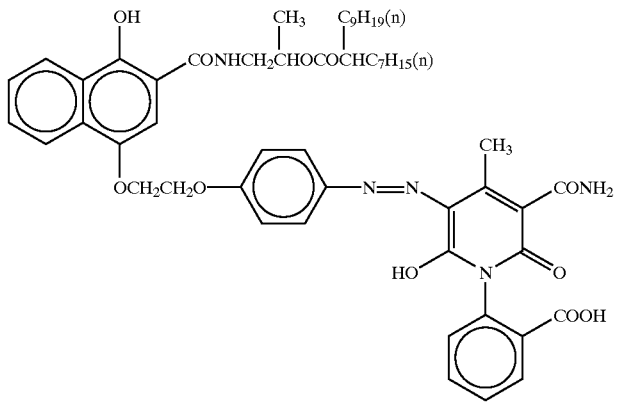
ExC-6
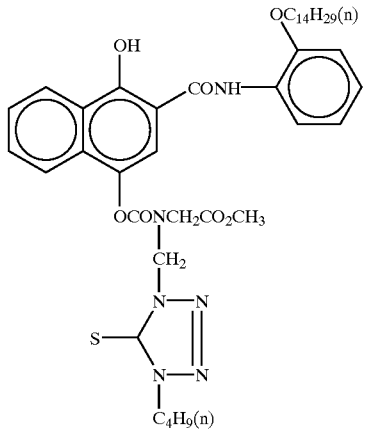

-continued
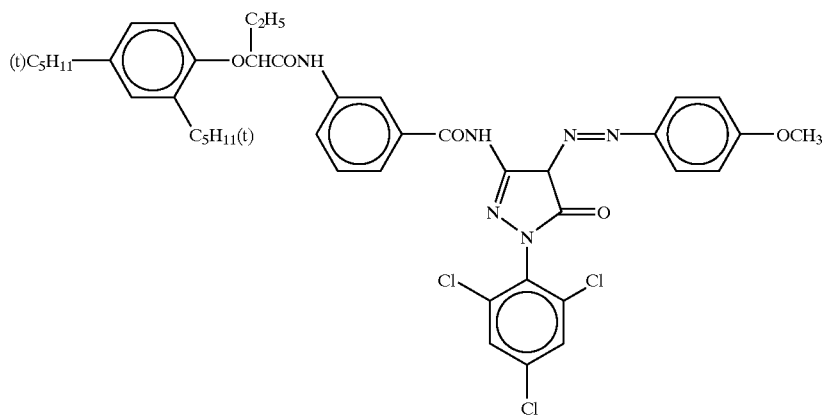
ExM-1
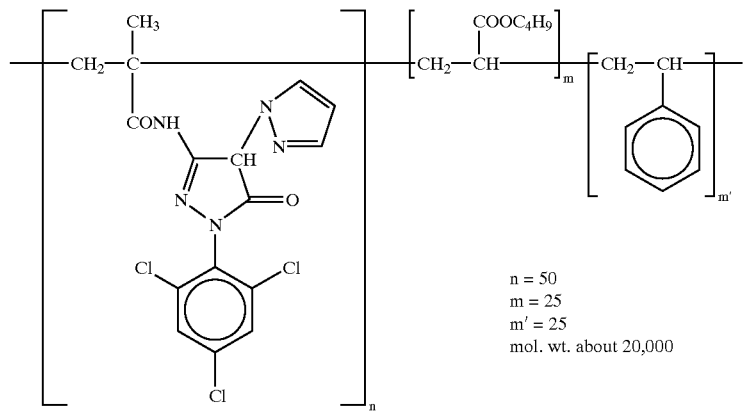
n = 50
m = 25
m' = 25
mol. wt. about 20,000
ExM-2
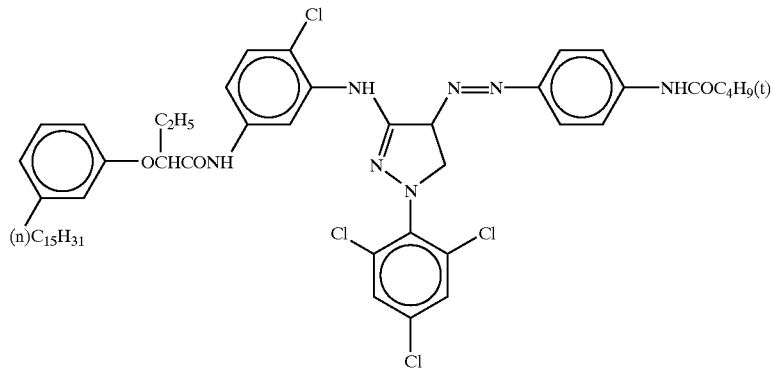
ExM-3
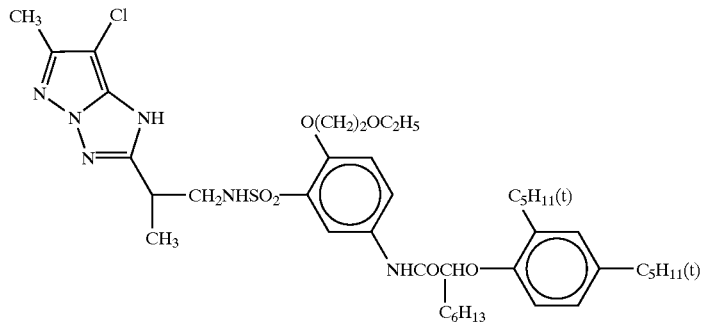
ExM-4

-continued
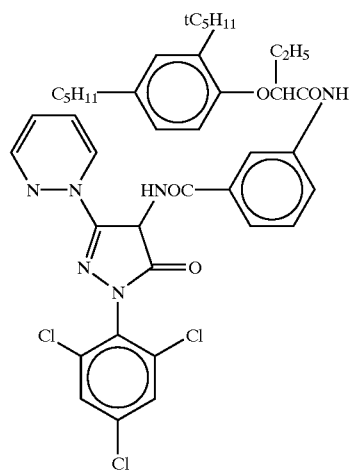
ExM-5
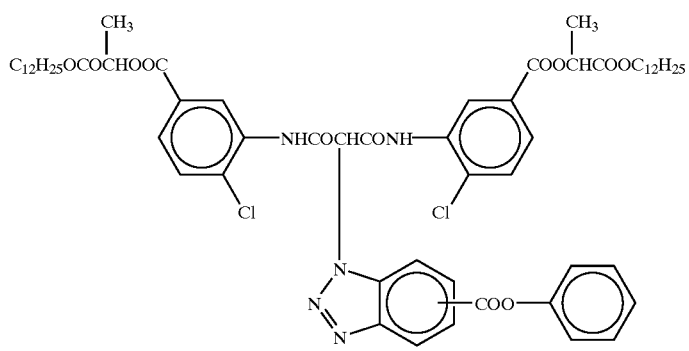
ExY-1
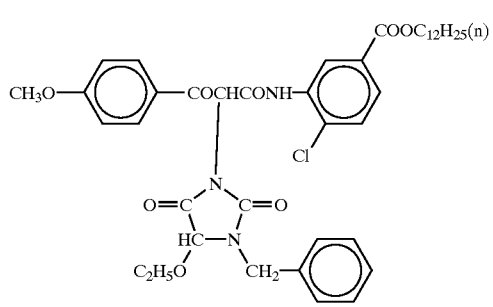
ExY-2
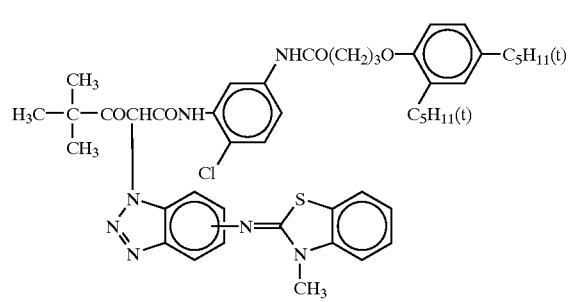
ExY-3
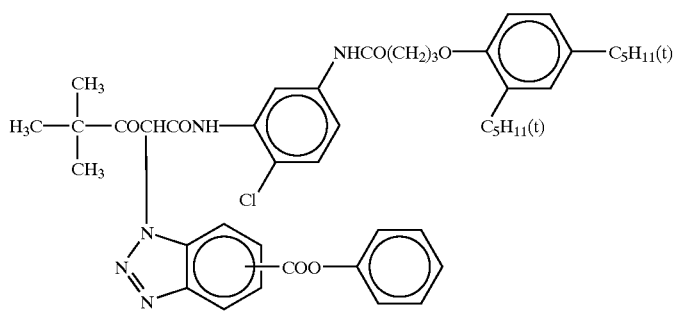
ExY-4

-continued
Cpd-1 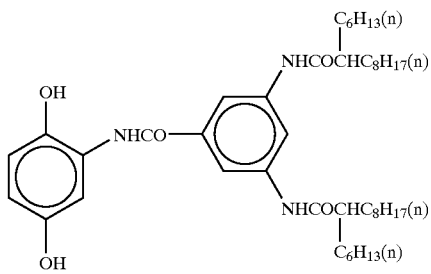
Cpd-2 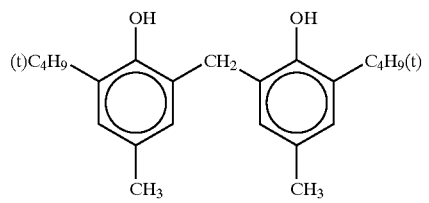
Cpd-3 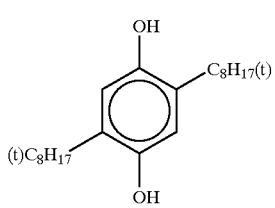
Cpd-4 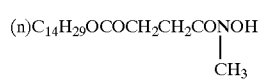
Cpd-5 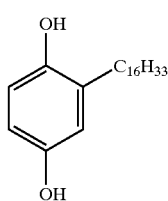
Cpd-6 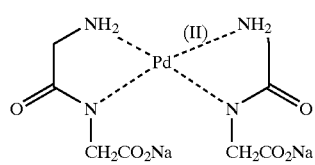
UV-1 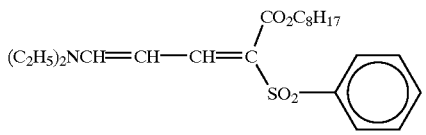
UV-2 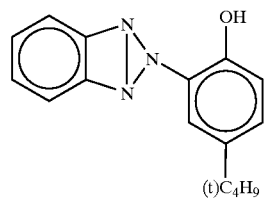
UV-3 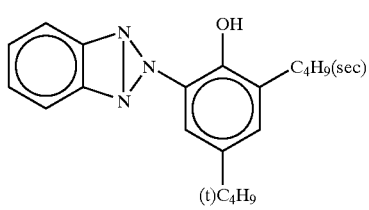
UV-4 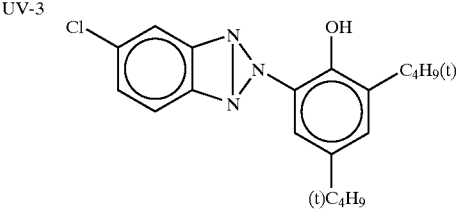
B-1 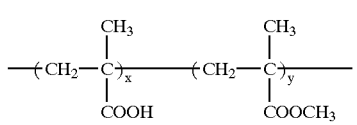
x/y = 10/90 (wt. ratio)
Av. mol. wt.: about 35,000
B-2 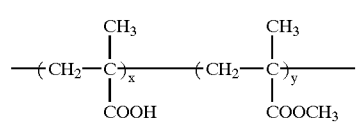
x/y = 40/60 (Wt. ratio)
Av. mol. wt.: about 20,000

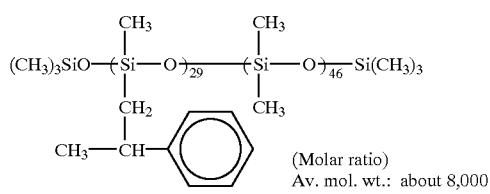
(Molar ratio)
Av. mol. wt.: about 8,000
B-3
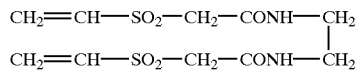
H-1
HBS-1 Tricresyl phosphate
HBS-2 Di-n-butyl phthalate
-continued
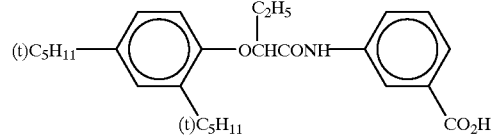
HBS-3
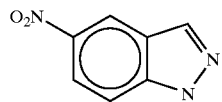
F-4
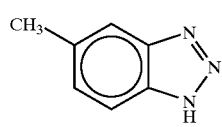
F-5
HBS-4 Tri(2-ethylhexyl)phosphate
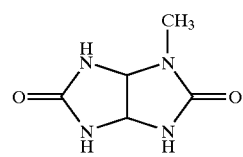
S-1
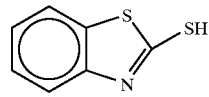
F-6
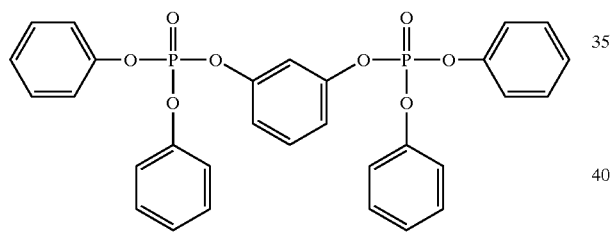
HBS-5
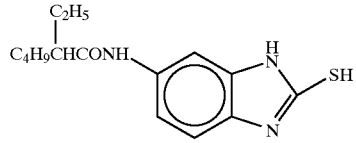
F-7
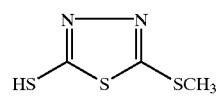
F-1
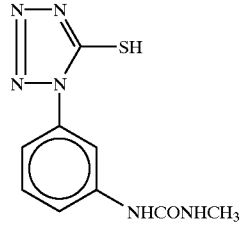
F-8
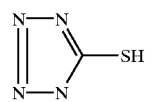
F-2
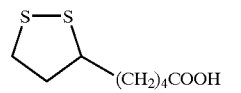
F-9
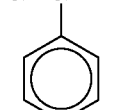
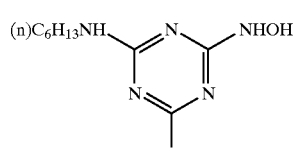
F-10
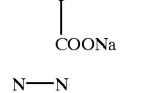
F-3
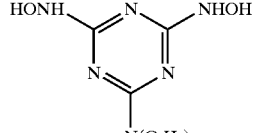
F-11
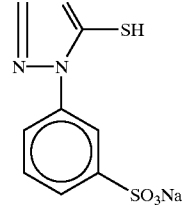

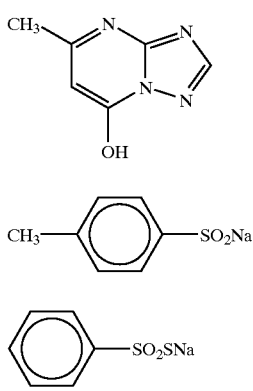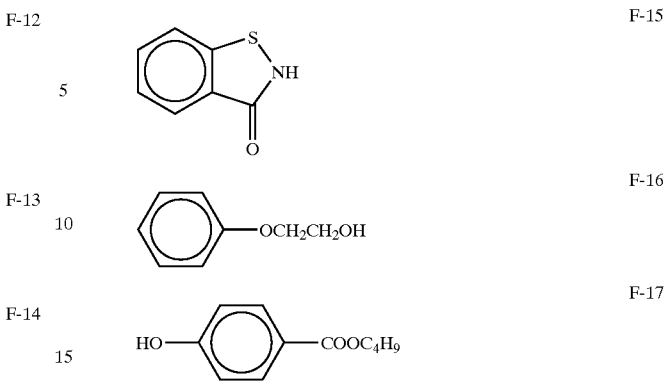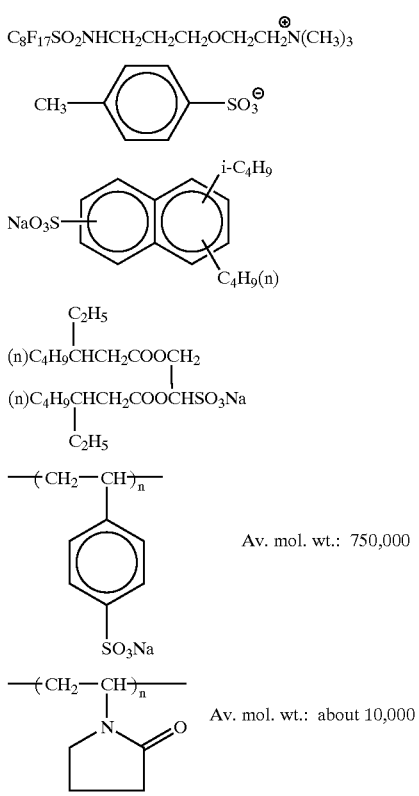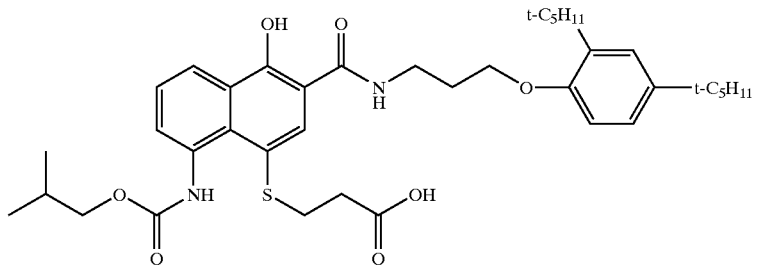

ExC-9
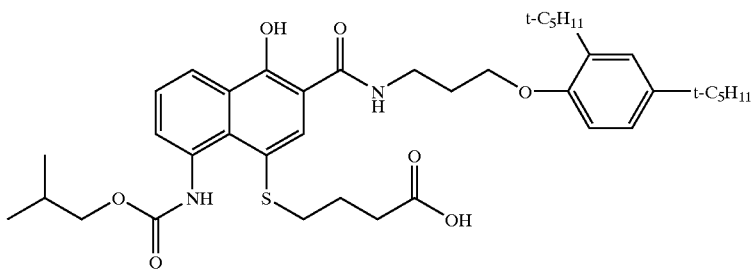
ExC-10
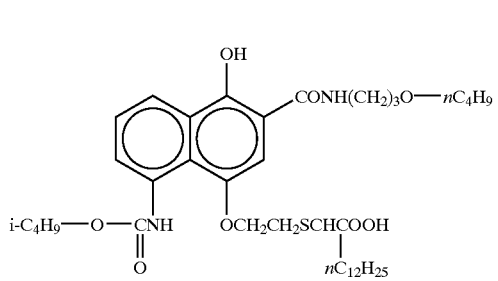
ExF-1
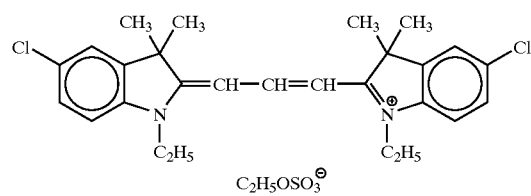
ExF-2
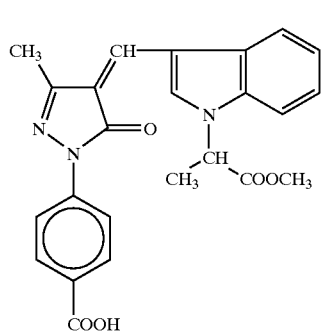
ExF-4
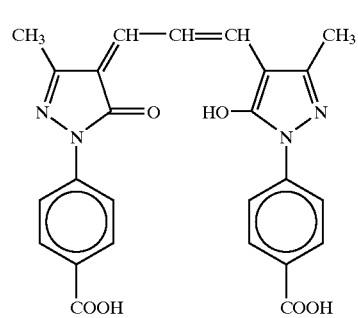
ExF-5
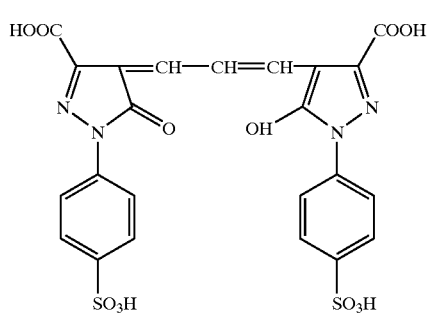
ExF-6
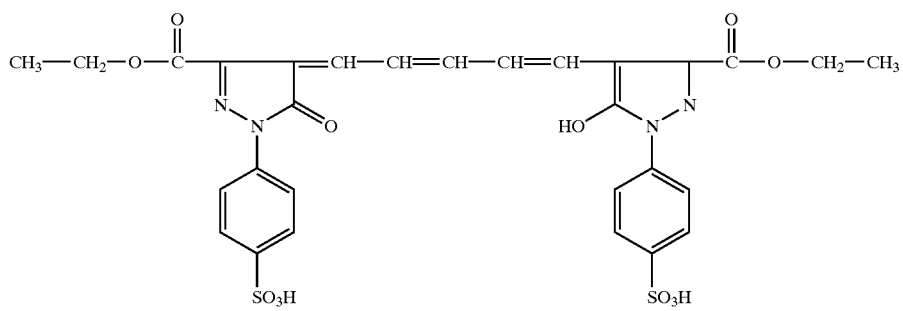

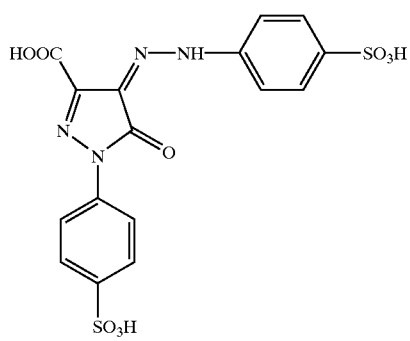

ExF-7

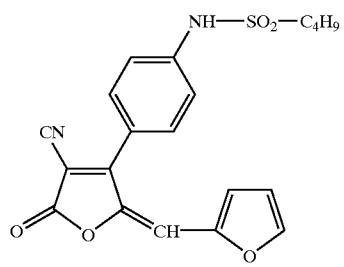

ExF-8

The ISO speed of the thus prepared sample 001 was 1600 (the method of calculating the speed will be described later).

Sample 002 was prepared in the same manner as the sample 001, except that the coating amount of ExF-5, 6 and 7 of the 15th layer was increased so as to cause the ISO speed to become 1000 and to attain an enhancement of sharpness.

Preparation of Lens-fitted Film Unit

Lens-fitted film units A to H were prepared in accordance with the procedure of Examples of JP-A-8-320538. These are prototypes based on fundamentally the same specification as that of New Utsurundesu Ace 800 Flash 27 (Quick Snap Super) produced by Fuji Photo Film Co., Ltd. except that the above samples 001 and 002 were used as the photographic film charged therein, and except that the shutter speed, stop and guide number of strobe were regulated as specified in Table 2.

TABLE 2

| Film | Loaded film | ISO Speed | Shutter speed | Diaphragm value | Strobe GNo | $\log_2(1/T) - \log_2(0.3XS)$ | Remarks |
|---|---|---|---|---|---|---|---|
| A | Sample 001 | 1600 | 1/100 | 16 | 10 | −2.26 | Inv. |
| B | Sample 002 | 1000 | 1/100 | 12.7 | 10 | −1.58 | Comp. |
| C | Sample 002 | 1000 | 1/100 | 16 | 10 | −1.58 | Comp. |
| D | Sample 002 | 1000 | 1/60 | 16 | 10 | −2.32 | Inv. |
| E | Sample 001 | 1600 | 1/100 | 8 | 7.5 | −2.26 | Inv. |
| F | Sample 002 | 1000 | 1/100 | 6.4 | 7.5 | −1.58 | Comp. |
| G | Sample 002 | 1000 | 1/100 | 8 | 7.5 | −1.58 | Comp. |
| H | Sample 002 | 1000 | 1/60 | 8 | 7.5 | −2.32 | Inv. |

Characteristic curves of Samples 001 and 002 were obtained in accordance with a conventional method. In the method, latent image time after exposure to light was set for 5 days, and the development was done as follows by using an automatic processor FP-360B manufactured by Fuji Photo Film Co., Ltd. Note that the processor was remodeled so that the overflow solution of the bleaching bath was not carried over to the following bath, but all of it was discharged to a waste fluid tank. The FP-360B processor was loaded with evaporation compensation means described in Journal of Technical Disclosure No. 94-4992.

Development processing of each sample is set forth below:

[Processing Procedure]

| Step | Time | Temp. | Qty. of replenisher* | Tank vol. |
|---|---|---|---|---|
| Color development | 3 min 15 sec | 37.8° C. | 20 mL | 17 L |
| Bleaching | 50 sec | 38° C. | 5 mL | 5 L |
| Fixing (1) | 50 sec | 38° C. | | 5 L |
| Fixing (2) | 50 sec | 38° C. | 8 mL | 5 L |
| Washing | 30 sec | 38° C. | 17 mL | 3.5 L |
| Stabilization (1) | 20 sec | 38° C. | | 3 L |
| Stabilization (2) | 20 sec | 38° C. | 15 mL | 3 L |
| Drying | 1 min 30 sec | 60° C. | | |

*The replenishment rate is a value per 1.1 m of a 35-mm wide lightsensitive material. ("L" means liter).

The stabilizer and fixing solution were fed from (2) to (1) by counter current. All the overflow of washing water was introduced into fixing bath (2). The amounts of drag-in of developer into the bleaching step, drag-in of bleaching solution into the fixing step and drag-in of fixer into the washing step were 2.5 mL, 2.0 mL and 2.0 mL, respectively, per 1.1 m of a 35-mm wide lightsensitive material. Each crossover time was 6 sec, which was included in the processing time of the previous step.

The open area of the above processor was 100 cm$^2$ for the color developer, 120 cm$^2$ for the bleaching solution and about 100 cm$^2$ for the other processing solutions.

The composition of each of the processing solutions was as follows.

| (Color developer) | Tank soln. (g) | Replenisher (g) |
|---|---|---|
| Diethylenetriamine-pentaacetic acid | 3.0 | 3.0 |
| Disodium catechol-3,5-disulfonate | 0.3 | 0.3 |
| Sodium sulfite | 3.9 | 5.3 |
| Potassium carbonate | 39.0 | 39.0 |
| Disodium-N,N-bis(2-sulfonatoethyl)hydroxylamine | 1.5 | 2.0 |
| Potassium bromide | 1.3 | 0.3 |
| Potassium iodide | 1.3 mg | — |
| 4-Hydroxy-6-methyl-1,3,3a,7-tetrazaindene | 0.05 | — |
| Hydroxylamine sulfate | 2.4 | 3.3 |
| 2-Methyl-4-[N-ethyl-N-(β-hydroxyethyl)amino]-aniline sulfate | 4.5 | 6.5 |
| Water | q.s. ad 1.0 L | q.s. ad 1.0 L |
| pH | 10.05 | 10.18. |

This pH was adjusted by the use of potassium hydroxide and sulfuric acid.

| (Bleaching soln.) | Tank soln. (g) | Replenisher (g) |
|---|---|---|
| Fe(III) ammonium 1,3-diamino-propanetetraacetate monohydrate | 113 | 170 |
| Ammonium bromide | 70 | 105 |
| Ammonium nitrate | 14 | 21 |
| Succinic acid | 34 | 51 |
| Maleic acid | 28 | 42 |
| Water | q.s. ad 1.0 L | q.s. ad 1.0 L |
| pH | 4.6 | 4.0. |

This pH was adjusted by the use of aqueous ammonia.
(Fixing (1) tank soln.)
5:95 (by volume) mixture of the above bleaching tank soln. and the following fixing tank soln, pH 6.8.

| (Fixing (2)) | Tank soln. (g) | Replenisher (g) |
|---|---|---|
| Aq. soln. of ammonium thiosulfate (750 g/L) | 240 mL | 720 mL |
| Imidazole | 7 | 21 |
| Ammonium methanethiosulfonate | 5 | 15 |
| Ammonium methanesulfinate | 10 | 30 |
| Ethylenediaminetetraacetic acid | 13 | 39 |
| Water | q.s. ad 1.0 L | q.s. ad 1.0 L |
| pH | 7.4 | 7.45. |

This pH was adjusted by the use of aqueous ammonia and acetic acid.

[Washing Water]

Tap water was passed through a mixed-bed column filled with H-type strongly acidic cation exchange resin (Amberlite IR-120B produced by Rohm & Haas Co.) and OH-type strongly basic anion exchange resin (Amberlite IR-400 produced by the same maker) so as to set the concentration of calcium and magnesium ions at 3 mg/L or less. Subsequently, 20 mg/L of sodium dichloroisocyanurate and 150 mg/L of sodium sulfate were added. The pH of the solution ranged from 6.5 to 7.5.

| (Stabilizer both (1) and (2)): common to tank solution and replenisher (g) | |
|---|---|
| Sodium p-toluenesulfinate | 0.03 |
| Polyoxyethylene p-monononylphenyl ether (average polymerization degree 10) | 0.2 |
| Sodium salt of 1,2-benzoisothiazolin-3-one | 0.10 |
| Disodium ethylenediaminetetraacetate | 0.05 |
| 1,2,4-triazole | 1.3 |
| 1,4-bis(1,2,4-triazol-1-ylmethyl)-piperazine | 0.75 |
| Water | q.s. ad 1.0 L |
| pH | 8.5 |

ISO seed was determined from the characteristic curves by a conventional method.

Practical photographing was performed with the use of each lens-fitted film unit, followed by the above-mentioned latent image aging and development processing. Thereafter, color paper development was carried out by the standard processing CP-45X using Fuji Color FA paper as a color paper at a magnification of 10/1.

The practical photographing was performed under the following conditions (five scenes were photographed under each of the conditions). A 5-grade organoleptic evaluation was performed by ten evaluators (one of them was the inventor), and evaluation of photographic properties was made by an average mark. Greater value of average mark means greater excellence in photographic properties. The results are listed in Table 3. The photographing was carried out in Minamiashigara City, Kanagawa Prefecture, in April, 2000 without exception.

(1) A distant landscape was photographed at about 2:00 p.m. in fine weather (LV 14);

(2) A woman model was photographed at a distance of 2 m at about 10:00 a.m. in slightly cloudy weather (LV 12);

(3) A woman model was snap photographed in the well-shaded precincts of a temple in slightly cloudy weather (LV 8.5 to 10.5) without the use of a strobe;

(4) A woman model was photographed at a distance of 2 m under fluorescent lamps indoors (LV 6) with the use of a strobe; and (5) A woman model was photographed at a distance of 5.5 m under fluorescent lamps indoors (LV 6) with the use of a strobe.

TABLE 3

| | | (1) | (2) | (3) | (4) | (5) | Total |
|---|---|---|---|---|---|---|---|
| A | Inv. | 4.5 | 4.6 | 3.7 | 4.3 | 3.8 | 20.9 |
| B | Comp. | 3.8 | 3.5 | 3.2 | 3.7 | 3.4 | 17.6 |
| C | Comp. | 4.6 | 4.2 | 2.4 | 4.1 | 2.9 | 18.2 |
| D | Inv. | 4.3 | 4.4 | 3.4 | 4.2 | 3.7 | 20.0 |
| E | Inv. | 3.5 | 3.8 | 4.7 | 4.7 | 4.7 | 21.4 |
| F | Comp. | 2.6 | 2.9 | 4.1 | 4.1 | 4.4 | 18.1 |
| G | Comp. | 3.5 | 3.3 | 3.8 | 4.2 | 4.0 | 18.8 |
| H | Inv. | 3.2 | 3.6 | 4.3 | 4.6 | 4.5 | 20.2 |

The results will be interpreted below with the addition of the inventor's comment made at the organoleptic evaluation.

Lens-fitted film units A and E are lens-fitted film units of the present invention as controls of this Example. With respect to the lens-fitted film unit A, it is intended to provide sharp photographs which cannot be expected with the use of conventional lens-fitted film units by causing the value of $\log_2(1/T) - \log_2(0.3 \times S)$ to fall within the range of the present invention and by closing down the aperture especially in daytime photographing.

The lens-fitted film unit E is one characterized by dark outdoor photographing and indoor strobe photographing while maintaining the sharpness in bright daytime photographing at a certain desirable level. Illustratively, the lens-fitted film unit E is one designed with the intent to not only reduce the unnatural finish due to black collapse in peripheral zone experienced in strobe photographing by compensating for the speed insufficiency and strobe flash range insufficiency of conventional lens-fitted films and further by lowering the strobe guide number but also attain unit size reduction and cost reduction.

In contrast, other prototype film units are those wherein films of relatively low speed (although the sharpness of the films at appropriate exposure is high) have been charged. Lens-fitted film units B and F are those whose system speed exhibited as a film unit has been set for a given level by changing the stop value thereof so as to cope with the lowness of film speed, and lens-fitted film units D and H are those wherein likewise the shutter speed thereof has been regulated. Lens-fitted film units C and G are those whose system speed has been left lowered by the lowness of film speed. As a result, it is apparent from Table 2 that the lens-fitted film units D and H are within the scope of the present invention while the lens-fitted film units B, C, F and G are outside the scope of the present invention.

In the scene (1) photographing, because of the brightness to which all the film units have satisfactory sensitivity, it can be stated that evaluation marks nearly completely correspond to stop values. It is noteworthy that the effect of stop is more remarkable than the use of films of high sharpness. This is apparent from a comparison between lens-fitted film units A and B and a comparison between lens-fitted film units E and F.

With respect to the evaluation results of scene (2) photographing, although such a clear explanation as in the scene (1) photographing cannot be made, it is contemplated that the results reflect addition of the fact that the lens-fitted film units C and G of low system speed tend to be slightly underexposure, thereby suffering drop of evaluation marks, to the same effect as in the scene (1).

With respect to the scene (3), although a similar sharpness effect is recognized, it is contemplated that the system speed exhibited as a film unit governed the evaluation marks most dominantly. That among the lens-fitted film units E, F and H of highest system speed, especially among the lens-fitted film units E and H of larger stop values according to the present invention, the lens-fitted film unit E of higher shutter speed gains the highest evaluation mark is a result of the production of a photograph of enhanced sharpness, and it can be stated that the effect of the present invention is directly exerted therein.

With respect to the scene (4), although the evaluation marks are high overall and photographs of some satisfaction are obtained from all of the lens-fitted film units, the ratio of photographs of natural finish realizing clear background description has especially been high from the lens-fitted film units E to H of high system speed, without the occurrence of such a phenomenon that a black collapse is caused in peripheral zones, resulting in unnatural finish. With respect to other evaluation mark differences, it is believed that they reflect differences in sharpness which is the main target of the present invention.

In the scene (5) photographing, differences in strobe flash range are a most dominant factor.

The usefulness of the present invention is apparent from the above interpretation of individual scenes and from the total evaluation marks over the various scenes as listed in Table 3.

Example 2

The same experiment as in Example 1 was carried out except that the support employed in the samples 001 and 002 of Example 1 of U.S. Pat. No. 597,682 was used in place of the support of cellulose triacetate film and except that the APS format was employed in place of the 135-format. Similar results were obtained.

Example 3

This example was carried out in order to attest to the usefulness of the lens-fitted film unit of the present invention which was fitted with photometric means capable of outputting a light quantity signal corresponding to a subject light quantity and a controlling mechanism capable of changing an exposure quantity to the film in accordance with the light quantity signal.

Upon an examination of the results of Table 3 of Example 1, it is apparent that most ideal photographs can be obtained by using the lens-fitted film unit A or D in scenes (1) and (2) and by using the lens-fitted film unit E or H in scenes (3), (4) and (5). The invention for realizing this is recited in claim 6, and an embodiment thereof is described in this Example.

The following lens-fitted film units each provided with photometric means capable of outputting a light quantity signal corresponding to a subject light quantity and a controlling mechanism capable of changing an exposure quantity to the film in accordance with the light quantity signal were loaded with samples 001 and 002 and evaluated in the same manner as in Example 2. The specifications of these lens-fitted film units were as indicated in Table 4, as described below.

Figure 2:
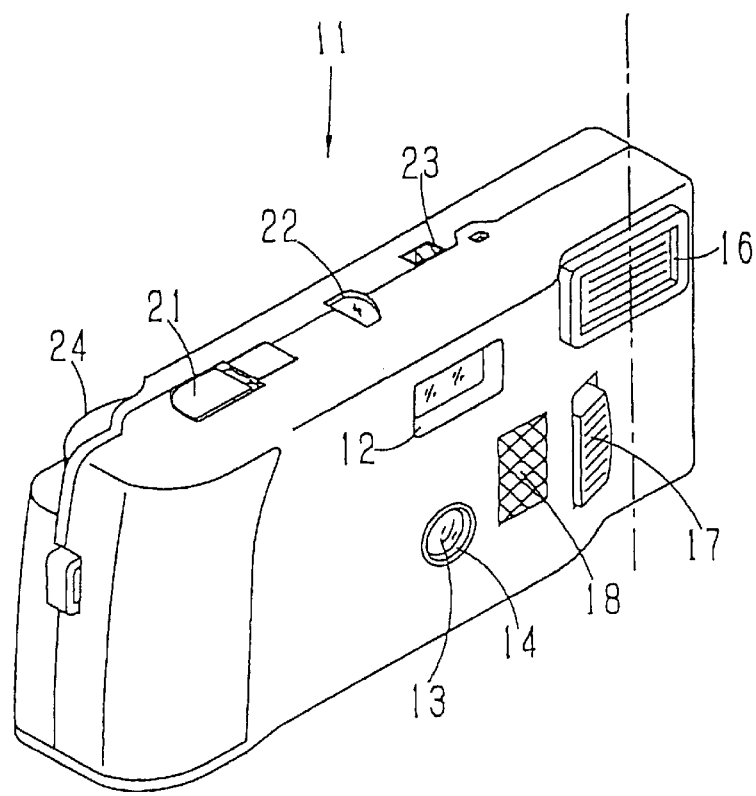

Referring to FIG. 2 showing the appearance of lens-fitted film unit 11, the front face of the lens-fitted film unit 11 is fitted with finder objective window 12, photographing window 14 through which taking lens 13 is exposed, and strobe flashing window 16. In this example, lens of f-number=8.0 or 6.4 is used as the taking lens 13. Strobe charging switch 17 is slidably disposed under the strobe flashing window 16. When the strobe charging switch 17 is slid, a strobe charging (electrification) is initiated.

Solar cell 18 is mounted beside the strobe charging switch 17. The solar cell 18 is photometric means for performing aperture control in accordance with a subject light quantity. The solar cell 18 connected to analog meter (described later, numeral 57) accommodated in the main frame is, for example, based on amorphous silicon. The solar cell 18 generates electromotive force corresponding to a received light quantity, which electromotive force drives the analog meter.

A photoreceptive face of the solar cell 18 is arranged at a place nearer to the strobe flashing window 16 than the taking lens 13 and nearer to the taking lens 13 than the center line (indicated by dashed line in the figure) of the strobe flashing window 16. This arrangement prevents interception of the photoreceptive face of the solar cell 18 by fingers holding the body of the lens-fitted film unit 11. Furthermore, photometry can be effected in the same direction as that of subject light incident on the taking lens 13 by virtue of the arrangement of the photoreceptive face at the front of the body of the lens-fitted film unit 11, so that accurate measurement of the subject light quantity can be accomplished.

The top of the lens-fitted film unit 11 is fitted with shutter button 21, film counter window 22 and charging completion indicating window 23. The back of the lens-fitted film unit 11 is fitted with winding up knob 24 and finder eyepiece window (see numeral 26 of FIG. 3).

Figure 3:
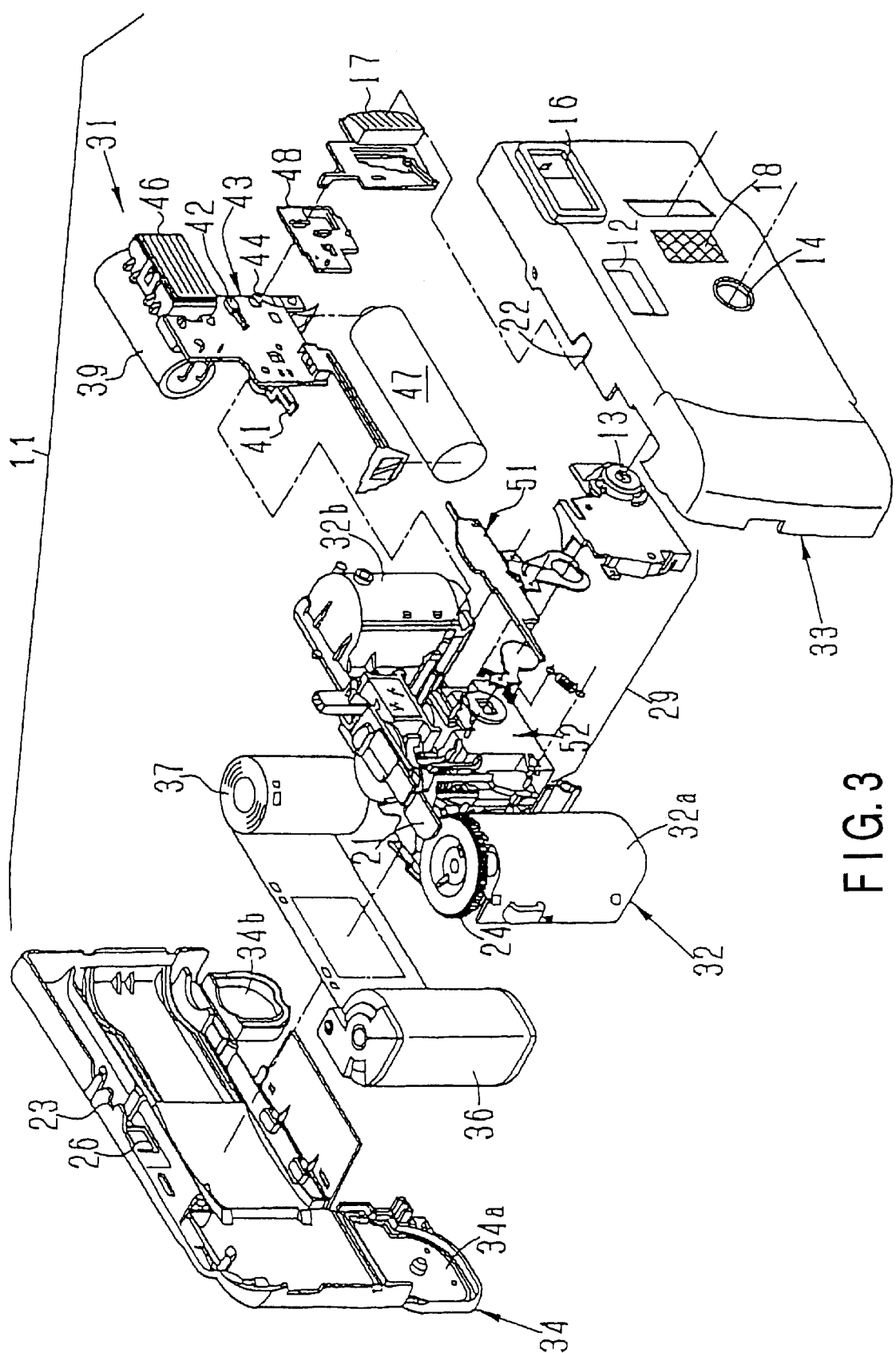
FIG. 3 is an exploded perspective view of the lens-fitted film unit of FIG. 1.

Referring now to FIG. 3, the lens-fitted film unit 11 comprises a unit body including body base 32 having its center fitted with exposure part 29 and strobe equipment 31, front cover 33 and rear cover 34, the front cover 33 and rear cover 34 extending over the front and rear parts of the body base 32, respectively, and further comprises cartridge 36 and photographic film 37 drawn out from the cartridge 36 and rolled.

The cartridge 36 and photographic film 37 are assembled in cartridge housing chamber 32a and film housing chamber 32b formed in the body base 32, respectively, in advance during the manufacturing of the lens-fitted film unit 11. Under the rear cover 34, there are integrally formed bottom lids 34a, 34b light-tightly covering bottom openings of the cartridge housing chamber 32a and film housing chamber 32b, respectively. The bottom lid 34a is opened at the time of taking out the cartridge 36 in which the photographic film 37 having been used in photographing is wound.

The winding up knob 24 is secured to an upper part of the cartridge housing chamber 32a, and a winding up shaft integrally formed at a lower side thereof is engaged with a spool of the cartridge 36. Each frame of photographic film 37 having been used in photographing is wound into the cartridge 36 by rotating the winding up knob 24 upon each photographing. Interlocked with the winding up of each film frame, a shutter mechanism assembled in the exposure part 29 is charged for subsequent photographing. Further, upon completion of feeding of one film frame, the rotation of the winding up knob 24 is locked by a lock lever assembled in the exposure part 29.

The strobe equipment 31 comprises circuit board 43 fitted with circuit parts such as main condenser 39, synchro switch 41, strobe flashing control switch 42 and a step-up coil; flashing part 46 including a strobe discharge tube, a reflector and other components; and power source battery 47. The flashing part 46 is exposed outside through the strobe flashing window 16. In the circuit board 43, a circuit pattern is printed and various circuit elements are mounted so as to provide a strobe circuit. The front of the circuit board 43 is fitted with not only the strobe flashing control switch 42 but also charging switch armature 44 and, arranged in front thereof, support plate 48 supporting the strobe switch 17.

The charging switch armature 44 is one for initiating a charging to the main condenser 39, and on/off thereof is effected by sliding of the strobe switch 17. The synchro switch 41 is one for feeding a trigger signal to the strobe circuit to thereby effect strobe flashing and is operated synchronously with the push down of the shutter button 21. The strobe flashing control switch 42 is one for controlling the on/off of strobe flashing in accordance with a subject light quantity and, interlocked with cam plate 51, is switched.

The exposure part 29 comprises, as a base, dark box base 52 protruding forwards in the form of a square tube and is fitted with not only a shutter mechanism and a winding up mechanism but also a finder mechanism. The back of the dark box base 52 is provided with an exposure framework, which limits a one-frame exposure range on the frontal surface of photographic film 37 fed to photographing position.

Figure 4:
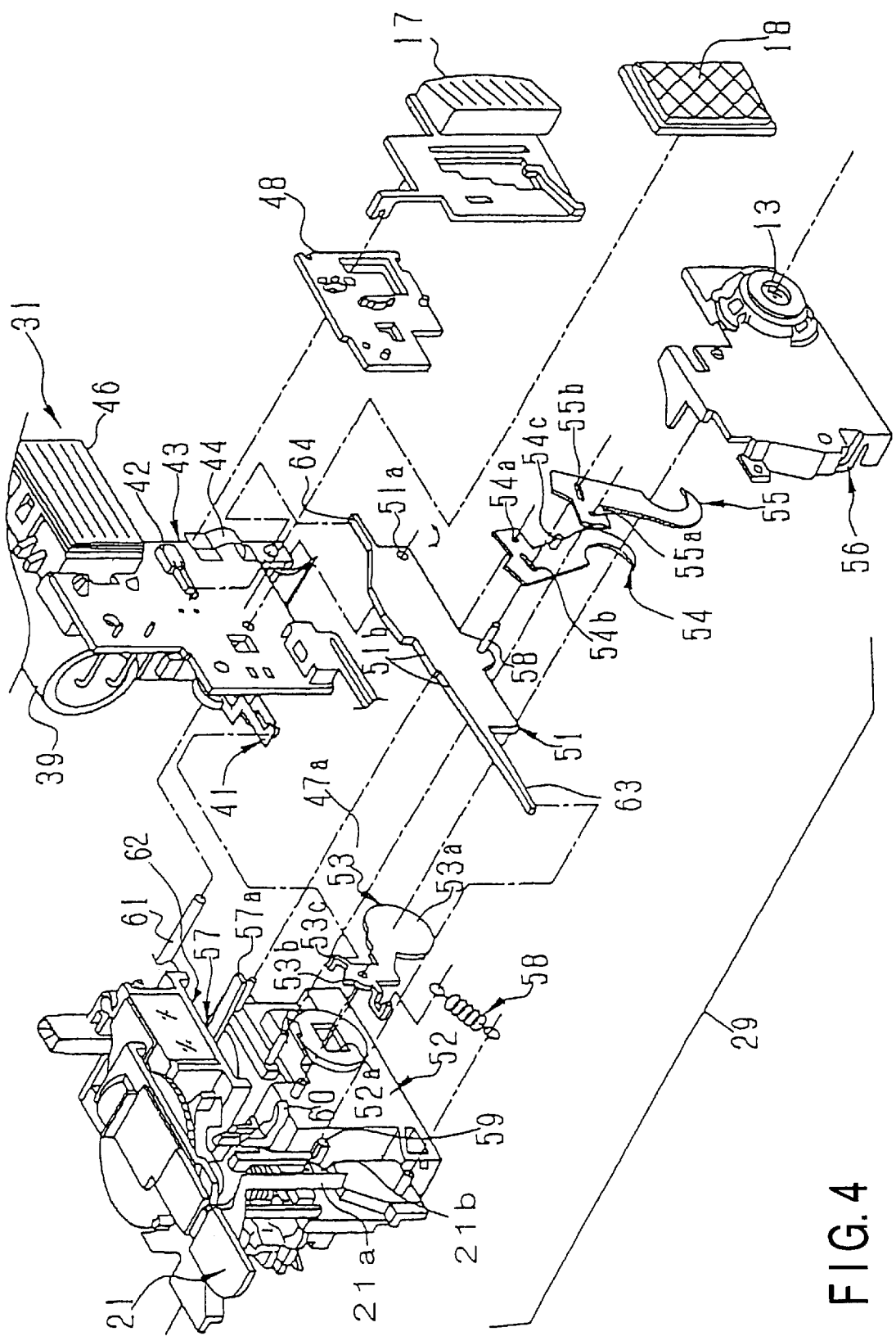
FIG. 4 is an exploded perspective view showing principal parts of the aperture controlling mechanism.

Referring to FIG. 4, the front of the dark box base 52 is provided with shutter opening 52a and, ahead thereof, fitted with shutter blade 53, a pair of aperture plates 54, 55 and shutter cover 56 covering these. The taking lens 13 is assembled in the shutter cover 56. The top surface of the dark box base 52 is fitted with analog meter 57 which, interlocked with the cam plate 51, controls the extent of movement of each of the aperture plates 54, 55. The analog meter 57 is a generally known current meter composed of a coil and a magnet, in which the deflection of needle 57a is changed in accordance with the quantity of fed current. The analog meter 57 is connected to the solar cell 18 and supplied with current therefrom. The cam plate 51 is engaged with the needle 57a, so that the extent of movement thereof is determined in accordance with the deflection of the needle 57a.

The shutter blade 53 is of the generally known kick type and comprises blade part 53a and, extending upward thereof, mounting part 53b. The mounting part 53b is engaged with a pin provided on the front of the dark box base 52 and is secured rotatably between closing position for closing the shutter opening 52a and opening position for opening the shutter opening 52a round the pin as a center axis. Spring 58 is fitted between the mounting part 53b and the dark box base 52, and the shutter blade 53 is energized toward the closing position by the spring 58.

When the shutter button 21 is depressed, kick part 21a disposed so as to extend downward thereof suppresses release lever 59. When the release lever 59 is suppressed, shutter charge is released with the result that kick lever 60 kicks the head of the mounting part 53b. As a result, the blade part 53a is rotated so that the shutter opening 52a is opened and closed. Further, the mounting part 53b is provided with suppression part 53c. The suppression part 53c is one for, interlocked with the opening and closing of the shutter, effecting strobe flashing, and, when the shutter blade 53 comes to a full open position, depresses the synchro switch 41 to thereby set the same to an on mode.

The aperture plates 54, 55 at lower portions thereof are provided with approximately semicircular cuts, which are arranged so as to be opposite to each other. The aperture plates 54, 55 have respective holes 54a, 55a, which are engaged with pins provided on the dark box base 52, with the result that the aperture plates 54, 55 are mounted rotatably. Rotation causes the aperture plates 54, 55 to overlap each other so that aperture opening is formed by the cuts. The size of the aperture opening is controlled by the degree of the overlapping.

Further, the aperture plates 54, 55 are provided with long holes 54b, 55b, respectively. Operating pin 58 provided on the cam plate 51 is pushed through the long holes 54b, 55b, so that the aperture plates 54, 55 are interlocked with the cam plate 51. Still further, the aperture plate 54 is fitted with regulation pin 54c. The regulation pin 54c is one for regulating the rotation of the aperture plate 55 and prevents the aperture opening from being fully opened by, for example, an error of engagement of the aperture plates 54, 55.

The cam plate 51 is one for rotating the aperture plates 54, 55. The material thereof consists of, for example, an elastic thin plastic. The cam plate 51 has hole 51a and is rotatably supported by engaging of the hole 51a with pin 61 provided on the body base 32. The top surface of the cam plate 51 is stepwise provided with cam face 51b. When the cam plate 51 is rotated clockwise as viewed from the front, the cam face 51b is brought into contact with the needle 57a. The cam face 51b has a two-step structure furnished with a high face and a low face. The extent of movement of the cam plate 51 exhibits two-stage changes depending on which face thereof is contacted by the needle 57a.

Regulation face 62 is provided integrally with the finder framework so as to be opposite to the cam face 51b above the needle 57a. The regulation face 62 regulates the rotation of the cam plate 51 while pushing the cam face 51b against the needle 57a. Further, the regulation face 62 clasps the needle 57a pushed against the cam face 51b in cooperation with the cam face 51b to thereby fix the position of the needle 57a.

The cam face 51b, when viewed from the front, is so formed that the left side is lower. Therefore, when the deflection of the needle 57a is small, the extent of rotation of the cam plate 51 is small. Contrarily, when the deflection of the needle 57a is large, the extent of rotation of the cam plate 51 is large. In accordance with the change of the extent of rotation of the cam plate 51, the extent of movement of the operating pin 58 is changed, and accordingly the extent of movement of the aperture plates 54, 55 is changed. As a result, the size of aperture opening is controlled in accordance with the subject light quantity.

The rotation of the cam plate 51 is interlocked with the shutter button 21. Thus, an end of the cam plate 51 is provided with interlock lever 63 which extends toward the kick part 21a. The interlock lever 63 is arranged so as to be engaged with protrusion 21b provided on the kick part 21a. When the shutter button 21 is depressed, the interlock lever 63 is pushed up by the protrusion 21b with the result that the cam plate 51 is rotated clockwise. Thus, the aperture plates 54, 55 are operated by the force applied for depressing the shutter button 21. Therefore, any power source for operating the aperture plates 54, 55 is not needed.

Figure 5:
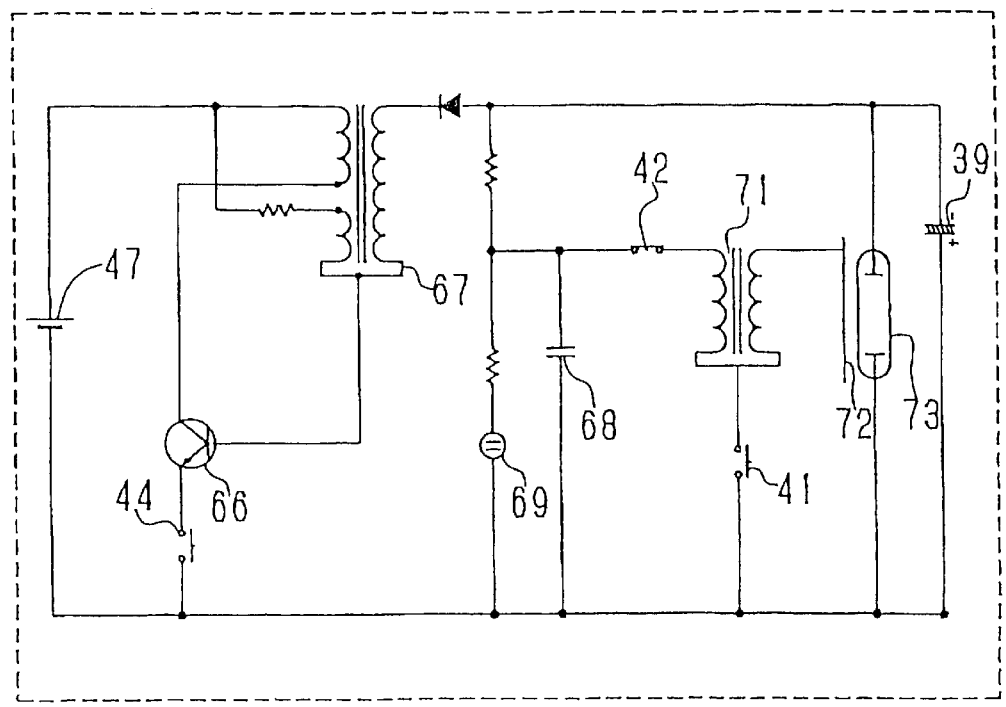
FIG. 5 is a circuit diagram showing a strobe circuit using a solar cell as photometric means.

Referring to FIG. 5 wherein an example of strobe circuit is shown, in the strobe circuit, when the charging switch armature 44 is put on, oscillating transistor 66 becomes conductive and step-up coil 67 is operated. Secondary current obtained from the step-up coil 67 electrifies the main condenser 39 and trigger condenser 68. When the main condenser 39 reaches a specified electrification level, neon tube 69 is lighted. When the synchro switch 41 is put on by the release of the shutter blade 53, discharging of the trigger condenser 68 causes current to flow through the primary side of trigger coil 71, and high voltage is generated in trigger electrode 72 connected to the secondary side of the trigger coil 71. As a result, electric charges stored in the main condenser 39 are released through strobe discharge tube 73, thereby effecting strobe flashing.

The strobe flashing control switch 42 is provided on a current feeding path from the trigger condenser 68 to the trigger coil 71. When the strobe flashing control switch 42 is on, current is fed to the trigger coil 71 to thereby effect strobe flashing. On the other hand, when the strobe flashing control switch 42 is off, strobe flashing is inhibited because current is not fed to the trigger coil 71 even if the synchro switch 41 is put on.

The function attained by the above constitution will be described with reference to FIG. 1 below. Referring first to FIG. 1A, when the subject light quantity is small, the deflection of the needle 57a is small and the needle 57a is positioned opposite to a high face of the cam face 51b. When in this condition the shutter button is depressed by hand, the protrusion 21b pushes the interlock lever 63 up. As a result, the cam plate 51 is rotated counterclockwise. Upon the rotation of the cam plate 51, the operating pin 58 is moved upward with the result that the aperture plates 54, 55 are rotated in the direction in which these approach each other. Thus, an aperture opening is formed.

The rotation of the cam plate 51 is stopped when the cam face 51b contacts the needle 57a and pushes the needle 57a against the regulation face 62. The extent of rotation of the cam plate 51 is small, so that the diameter of the aperture opening becomes large.

At that time, the needle 57a is sandwiched between the cam face 51b and the regulation face 62 and fixed at that position. Accordingly, the position of the needle 57a is not changed even if the subject light quantity is changed until the shutter button 21 is fully depressed and the shutter is operated. Therefore, it never occurs that the diameter of the aperture opening is changed during the shutter operation.

When, in that state, further the shutter button 21 is depressed, as shown by a two-dot long and two short dashes line in FIG. 1, the interlock lever 63 is further suppressed by the protrusion 21b to thereby undergo an elastic deformation. This elastic deformation permits the full depression of the shutter button 21. When the shutter button 21 is fully depressed, receiving the suppression from the kick part 21a, the release lever 59 is released with the result that the shutter blade 53 is opened and closed.

When the shutter blade 53 is opened and closed, the synchro switch 41 is put on, and, if the main condenser 39 has been charged, strobe flashing is effected. The subject light having been transmitted through the taking lens 13 is passed through the aperture opening and reaches the photographic film 37 where an image is formed. Since the aperture opening has a large diameter, appropriate exposure can be obtained. When hold of the shutter button 21 is let go, the kick part 21a is detached from the interlock lever 63, so that the cam plate 51 is rotated counterclockwise by its own weight to thereby return to the original position.

Figure 1B:
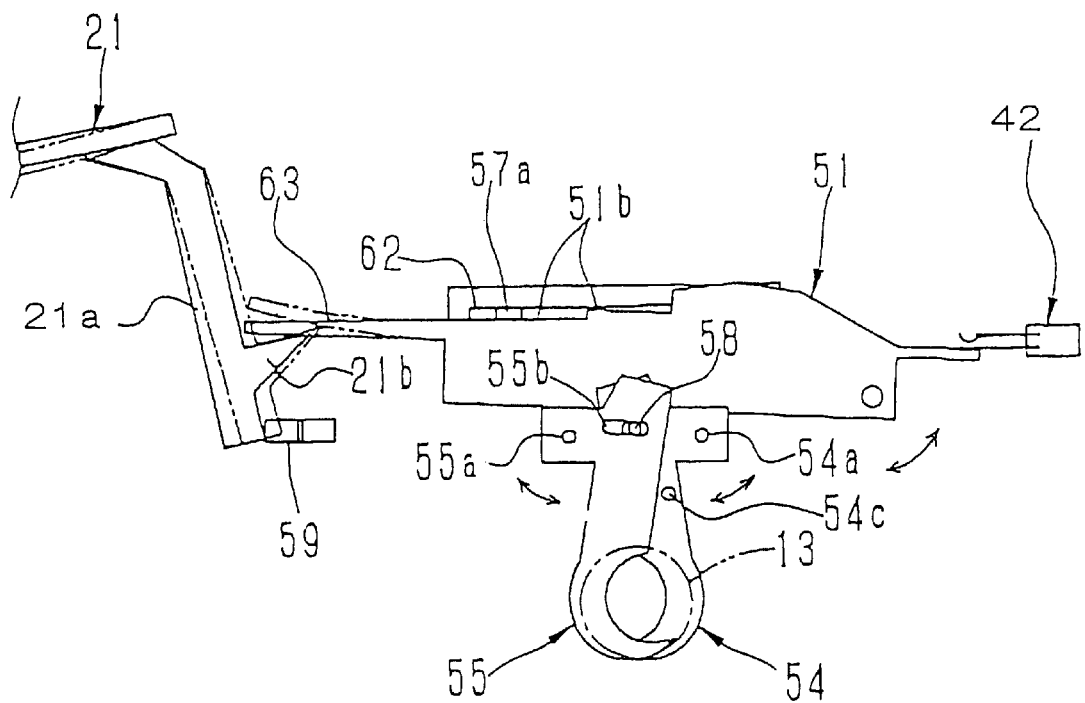

On the other hand, when the subject light quantity is large, the deflection of the needle 57a is so large that the needle 57a becomes positioned opposite to a low face of the cam face 51b, as shown in FIG. 1B. When in this condition the shutter button 21 is depressed by hand the protrusion 21b pushes the interlock lever 63 up, and the cam plate 51 is rotated until the cam face 51b pushes the needle 57a against the regulation face 62. At that time, the extent of rotation of the cam plate 51 is so large that not only the extent of movement of the operating pin 58 but also the extent of rotation of the aperture plates 54, 55 is increased. Thus, such a control that the aperture opening has a small diameter is accomplished.

When, in this condition, further the shutter button 21 is depressed, as shown by a two-dot long and two short dashes line in the figure, the interlock lever 63 undergoes an elastic deformation, thereby permitting the full depression of the shutter button 21. When the shutter button 21 is fully depressed and the shutter blade 53 is opened and closed, the synchro switch 41 is put on. The subject light having been transmitted through the taking lens 13 is passed through the aperture opening and reaches the photographic film 37 where an image is formed. Since the aperture opening is controlled so as to have a small diameter, appropriate exposure can be obtained.

Although the above Example describes an instance wherein a solar cell is used as photometric means, the photometric means is not limited to the solar cell and use may be made of a photoconductive element. For example, CdS or a photodiode can be used as the photoconductive element.

Lens-fitted film units I to L according to the specifications of Table 4 were prepared, and exactly the same evaluation as in Example 1 was carried out with respect to them. The results are listed in Table 5.

TABLE 4

|   | ISO Speed | Shutter speed | Large aperture | Small aperture | Switch luminance | GNo | $\log_2(1/T) - \log_2(0.3XS)$ | Remarks |
|---|---|---|---|---|---|---|---|---|
| I | 1600 | 1/100 | 8 | 16 | 11.4 | 7.5 | −2.26 | Inv. |
| J | 1000 | 1/100 | 6.4 | 12.7 | 11.4 | 7.5 | −1.58 | Comp. |
| K | 1000 | 1/100 | 8 | 16 | 11.4 | 7.5 | −1.58 | Comp. |
| L | 1000 | 1/60 | 8 | 16 | 11.4 | 7.5 | −2.32 | Inv. |

TABLE 5

|   |   | (1) | (2) | (3) | (4) | (5) | Total |
|---|---|---|---|---|---|---|---|
| I | Inv. | 4.5 | 4.6 | 4.7 | 4.7 | 4.7 | 23.2 |
| J | Comp. | 3.8 | 3.5 | 4.1 | 4.1 | 4.4 | 19.9 |
| K | Comp. | 4.6 | 4.2 | 3.8 | 4.2 | 4.0 | 20.8 |
| L | Inv. | 4.3 | 4.4 | 4.3 | 4.6 | 4.5 | 22.1 |

As easily seen from the results of Example 1, very high evaluation marks were obtained in all the scenes. Further, it is apparent that the lens-fitted film units I and L according to the present invention are superior to the comparative lens-fitted film units J and K.

Example 4

This Example was carried out in order to attest to the usefulness of claims 2, 3 and 4. All the lens-fitted film units of this Example fall within the scope of claim 1 of the present invention.

Lens-fitted film units A2 to A7 were prepared in the same manner as the lens-fitted film unit A of Example 1 except that the photographic film 001 charged therein were changed to the following films 402 to 407, respectively.

Samples 402 to 407 were prepared in the same manner as the sample 001 except that only the silver content and employed emulsion of each of the maximum-speed layers of two or more red-sensitive emulsion layers, two or more green-sensitive emulsion layers and two or more blue-sensitive emulsion layers, the 6th layer, the 11th layer and the 14th layer were changed as specified in Table 6.

TABLE 6

| No | Layer number | E.C.D. $D_c(\mu m)$ | Grain thickness $T_h(\mu m)$ | A.R. $D_c/T_h$ | E.S.D. $(\mu m)$ | $A_H$ $(g/m^2)$ | Grain number | Total of $A_H$ $(g/m^2)$ |
|---|---|---|---|---|---|---|---|---|
| 001 | 6th | 2.50 | 0.25 | 10.0 | 1.33 | 1.29 | 0.83 | 3.37 |
|  | 11th | 2.63 | 0.23 | 11.4 | 1.33 | 0.92 | 0.58 |  |
|  | 14th | 3.10 | 0.31 | 10.0 | 1.65 | 1.16 | 0.39 |  |
| 402 | 6th | 2.30 | 0.23 | 10.0 | 1.22 | 1.29 | 1.06 | 3.37 |
|  | 11th | 2.63 | 0.23 | 11.4 | 1.33 | 0.92 | 0.58 |  |
|  | 14th | 3.10 | 0.31 | 10.0 | 1.65 | 1.16 | 0.39 |  |
| 403 | 6th | 2.10 | 0.21 | 10.0 | 1.11 | 1.29 | 1.39 | 3.37 |
|  | 11th | 2.63 | 0.23 | 11.4 | 1.33 | 0.92 | 0.58 |  |
|  | 14th | 3.10 | 0.31 | 10.0 | 1.65 | 1.16 | 0.39 |  |
| 404 | 6th | 2.50 | 0.25 | 10.0 | 1.33 | 1.19 | 0.76 | 3.37 |
|  | 11th | 2.63 | 0.23 | 11.4 | 1.33 | 0.85 | 0.534 |  |
|  | 14th | 3.10 | 0.31 | 10.0 | 1.65 | 1.33 | 0.45 |  |
| 405 | 6th | 2.50 | 0.25 | 10.0 | 1.33 | 1.09 | 0.70 | 3.37 |
|  | 11th | 2.63 | 0.23 | 11.4 | 1.33 | 0.77 | 0.48 |  |
|  | 14th | 3.10 | 0.31 | 10.0 | 1.65 | 1.51 | 0.51 |  |
| 406 | 6th | 2.50 | 0.25 | 10.0 | 1.33 | 1.29 | 0.83 | 3.53 |
|  | 11th | 2.63 | 0.23 | 11.4 | 1.33 | 1.02 | 0.64 |  |
|  | 14th | 3.10 | 0.31 | 10.0 | 1.65 | 1.22 | 0.41 |  |
| 407 | 6th | 2.50 | 0.25 | 10.0 | 1.33 | 1.29 | 0.83 | 3.69 |
|  | 11th | 2.63 | 0.23 | 11.4 | 1.33 | 1.12 | 0.70 |  |
|  | 14th | 3.10 | 0.31 | 10.0 | 1.65 | 1.28 | 0.43 |  |

E.C.D. = Equivalent Circle Diameter
A.R. = Aspect Ratio
E.S.D = Equivalent Sphere Diameter The samples 402 to 407 were evaluated in two scenes, i.e., scenes (1) and (4) in the same manner as in Example 1. The results are listed in Table 7.

TABLE 7

| No | $A_H$ (g/m²) | Grain number | Total of $A_H$ (g/m²) | Scene (1) | Scene (4) | Total |
|----|--------------|--------------|-----------------------|-----------|-----------|-------|
| A  | 1.29         | 0.83         | 3.37                  | 4.5       | 4.3       | 8.8   |
|    | 0.92         | 0.58         |                       |           |           |       |
|    | 1.16         | 0.39         |                       |           |           |       |
| A2 | 1.29         | 1.06         | 3.37                  | 4.4       | 4.0       | 8.4   |
|    | 0.92         | 0.58         |                       |           |           |       |
|    | 1.16         | 0.39         |                       |           |           |       |
| A3 | 1.29         | 1.39         | 3.37                  | 4.3       | 3.8       | 8.1   |
|    | 0.92         | 0.58         |                       |           |           |       |
|    | 1.16         | 0.39         |                       |           |           |       |
| A4 | 1.19         | 0.76         | 3.37                  | 4.2       | 4.2       | 8.4   |
|    | 0.85         | 0.534        |                       |           |           |       |
|    | 1.33         | 0.45         |                       |           |           |       |
| A5 | 1.09         | 0.70         | 3.37                  | 3.9       | 4.0       | 7.9   |
|    | 0.77         | 0.48         |                       |           |           |       |
|    | 1.51         | 0.51         |                       |           |           |       |
| A6 | 1.29         | 0.83         | 3.53                  | 4.3       | 4.2       | 8.5   |
|    | 1.02         | 0.64         |                       |           |           |       |
|    | 1.22         | 0.41         |                       |           |           |       |
| A7 | 1.29         | 0.83         | 3.69                  | 4.0       | 4.0       | 8.0   |
|    | 1.12         | 0.70         |                       |           |           |       |
|    | 1.28         | 0.43         |                       |           |           |       |

The effect of grain number is apparent from a comparison between lens-fitted film units A2 and A3 and lens-fitted film unit A. The effect of silver content of each maximum-speed emulsion layer is apparent from a comparison between lens-fitted film units A4 and A5 and lens-fitted film unit A. The effect of total silver content of maximum-speed emulsion layers is apparent from a comparison between lens-fitted film units A6 and A7 and lens-fitted film unit A.

It is seen that the evaluation marks of lens-fitted film units A2 and A3 are low because of the insufficiency in not only sharpness in distant landscape photographing in scene (1) but also background description in scene (4). With respect to lens-fitted film units A4 and A5, sharpness deterioration has been especially serious in distant landscape photographing in scene (1). Lens-fitted film units A6 and A7 have resulted in an unsharp finish with some dull feeling in both the scenes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lens-fitted film unit comprising photographic mechanisms including a taking lens, a shutter device and an aperture, and having been loaded with an unexposed photographic film, wherein the shutter device and the photographic film satisfying the conditional formula:

$$\log_2(1/T) - \log_2(0.3 \times S) < -1.7$$

wherein T represents a shutter speed of the shutter device and S represents an ISO speed of the photographic film;

wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support;

wherein at least one of the blue-sensitive, green-sensitive and red-sensitive silver halide emulsion layers with the maximum photographic speeds contains a silver halide emulsion in which 60% or more of the total projected area of the grains contained in the silver halide emulsion is occupied by tabular grains having an aspect ratio of 5.0 or more; and wherein, with respect to the silver halide emulsion contained in the at least one silver halide emulsion layer having the maximum photographic speed and containing the tabular grains, the grain number defined by the following formula (I) is 1.00 or less, $$\text{grain number} = A_H/(D_c^2 \times T_h) \tag{I}$$

wherein $A_N$: a silver coating amount in terms of silver of the silver halide contained in the layer with the maximum photographic speed (g/m²), $D_c$: an average equivalent circle diameter of the tabular grains contained in the layer with the maximum photographic speed (μm), and $T_h$: an average thickness of the tabular grains contained in the layer with the maximum photographic speed (μm), provided that, when each of the at least one layer with the maximum photographic speed contains a plurality of silver halide emulsions which was prepared by separate production processes and which contains silver halide grains of different average equivalent sphere diameters, it is only required that the above limitations with respect to the aspect ratio and grain number be satisfied with respect to the emulsion having the maximum average equivalent sphere diameter.

2. The lens-fitted film unit according to claim 1, wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support;

wherein the blue-sensitive, green-sensitive and red-sensitive silver halide emulsion layers with the maximum photographic speeds each have a silver content of 0.3 to 1.3 g/m²; and wherein at least two of the blue-sensitive, green-sensitive and red-sensitive silver halide emulsion layers with the maximum photographic speeds each contain silver halide grains in which 60% or more of the total projected area of the silver halide grains is occupied by tabular grains having an aspect ratio of 5.0 or more.

3. The lens-fitted film unit according to claim 1, wherein the unexposed photographic film comprises at least two blue-sensitive silver halide emulsion layers with different photographic speeds, at least two green-sensitive silver halide emulsion layers with different photographic speeds and at least two red-sensitive silver halide emulsion layers with different photographic speeds, on a support;

wherein the blue-sensitive, green-sensitive and red-sensitive silver halide emulsion layers with the maximum photographic speeds have the total silver content of 1.5 to 3.5 g/m$^2$; and wherein at least two of the blue-sensitive, green-sensitive and red-sensitive silver halide emulsion layers with the maximum photographic speeds each contain silver halide grains in which 60% or more of the total projected area of the silver halide grains is occupied by tabular grains having an aspect ratio of 5.0 or more.

4. The lens-fitted film unit according to claim 1, wherein the tabular silver halide grains are those:
   (a) whose average silver iodide content is in the range of 2 to 10 mol %,
   (b) whose surface silver iodide content is in the range of 1 to 4 mol %, and
   (c) having 10 or more dislocation lines per grain.

5. The lens-fitted film unit according to claim 2, wherein the tabular silver halide grains are those:
   (a) whose average silver iodide content is in the range of 2 to 10 mol %,
   (b) whose surface silver iodide content is in the range of 1 to 4 mol %, and
   (c) having 10 or more dislocation lines per grain.

6. The lens-fitted film unit according to claim 3, wherein the tabular silver halide grains are those:
   (a) whose average silver iodide content is in the range of 2 to 10 mol %,
   (b) whose surface silver iodide content is in the range of 1 to 4 mol %, and
   (c) having 10 or more dislocation lines per grain.

7. The lens-fitted film unit according to claim 1, which further comprises photometric means capable of outputting a light quantity signal corresponding to a subject light quantity, and a controlling mechanism capable of changing an exposure quantity to the photographic film in accordance with the light quantity signal.

8. The lens-fitted film unit according to claim 2, which further comprises photometric means capable of outputting a light quantity signal corresponding to a subject light quantity, and a controlling mechanism capable of changing an exposure quantity to the photographic film in accordance with the light quantity signal.

9. The lens-fitted film unit according to claim 3, which further comprises photometric means capable of outputting a light quantity signal corresponding to a subject light quantity, and a controlling mechanism capable of changing an exposure quantity to the photographic film in accordance with the light quantity signal.

10. The lens-fitted film unit according to claim 4, which further comprises photometric means capable of outputting a light quantity signal corresponding to a subject light quantity, and a controlling mechanism capable of changing an exposure quantity to the photographic film in accordance with the light quantity signal.

11. The lens-fitted film unit according to claim 5, which further comprises photometric means capable of outputting a light quantity signal corresponding to a subject light quantity, and a controlling mechanism capable of changing an exposure quantity to the photographic film in accordance with the light quantity signal.

12. The lens-fitted film unit according to claim 6, which further comprises photometric means capable of outputting a light quantity signal corresponding to a subject light quantity, and a controlling mechanism capable of changing an exposure quantity to the photographic film in accordance with the light quantity signal.

13. The lens-fitted film unit according to claim 1, wherein the ISO speed S is 100, 400 or 1600.

14. The lens-fitted film unit according to claim 1, wherein the value of the conditional formula $\log_2(1/T)-\log_2(0.3\times S)$ is from −4 to less than −1.8.

15. The lens-fitted film unit according to claim 1, wherein the value of the conditional formula $\log_2(1/T)-\log_2(0.3\times S)$ is from −3.5 to less than −1.9.

16. The lens-fitted film unit according to claim 1, wherein the shutter speed T is in the range of 1/30 to 1/500 sec.

17. The lens-fitted film unit according to claim 1, wherein the ISO speed S is 640 or more.

18. The lens-fitted film unit according to claim 1, wherein said lens-fitted film unit has a fixed aperture, and the stop value is in the range of 5.6 to 18.

19. The lens-fitted film unit according to claim 1, wherein said silver halide tabular emulsion is in all of said blue-sensitive, green-sensitive and red-sensitive silver halide emulsion layers.

20. The lens-fitted film unit according to claim 1, wherein 70% or more of the total projected area of the grains contained in the silver halide emulsion is occupied by tabular grains.

21. The lens-fitted film unit according to claim 1, wherein the aspect ratio of the tabular silver halide grains is 8 or more.

* * * * *